US012795718B2

United States Patent
(12) United States Patent
Hong et al.

(10) Patent No.: US 12,795,718 B2
(45) Date of Patent: Nov. 10, 2026

(54) METHOD AND DEVICE FOR INITIAL BEAM ACCESS BETWEEN TERMINALS IN SIDELINK COMMUNICATION

(71) Applicants: HYUNDAI MOTOR COMPANY, Seoul (KR); KIA CORPORATION, Seoul (KR); WONKWANG UNIVERSITY CENTER FOR INDUSTRY-ACADEMY COOPERATION, Iksan-si (KR)

(72) Inventors: Ui Hyun Hong, Hwaseong-si (KR); Gene Back Hahn, Hwaseong-si (KR); Hyuk Min Son, Seoul (KR)

(73) Assignees: HYUNDAI MOTOR COMPANY, Seoul (KR); KIA CORPORATION, Seoul (KR); WONKWANG UNIVERSITY CENTER FOR INDUSTRY-ACADEMY COOPERATION, Iksan-si (KR)

( * ) Notice: Subject to any disclaimer, the term of this patent is extended or adjusted under 35 U.S.C. 154(b) by 273 days.

(21) Appl. No.: 18/784,547

(22) Filed: Jul. 25, 2024

(65) Prior Publication Data

US 2024/0381410 A1 Nov. 14, 2024

Related U.S. Application Data

(63) Continuation of application No. PCT/KR2023/001201, filed on Jan. 26, 2023.

(30) Foreign Application Priority Data

Jan. 28, 2022 (KR) ........................ 10-2022-0013535

(51) Int. Cl.
*H04W 74/00* (2009.01)
*H04B 7/06* (2006.01)
(Continued)

(52) U.S. Cl.
CPC ........ *H04W 74/002* (2013.01); *H04B 7/0695* (2013.01); *H04W 56/001* (2013.01); *H04W 74/0833* (2013.01)

(58) Field of Classification Search
None
See application file for complete search history.

(56) References Cited

U.S. PATENT DOCUMENTS 11,510,211 B2 11/2022 Ji
2019/0182817 A1* 6/2019 Agiwal ................ H04B 7/0617
(Continued)

FOREIGN PATENT DOCUMENTS

KR 20210003153 A 1/2021

OTHER PUBLICATIONS

CATT, Feature lead summary #1 on AI 7.2.4.3 Sidelink synchronization mechanism, R1-2006948, 3GPP TSG RAN WG1 #102e, e-Meeting. Aug. 2020., 27pp.
Intel Corporation, Views on Rel-18 NR Sidelink Enhancements, RP-212918, 3GPP TSG RAN WG #94e, e-Meeting. Nov. 29, 2021., 7pp.
(Continued)

*Primary Examiner* — Kouroush Mohebbi
(74) *Attorney, Agent, or Firm* — Lempia Summerfield Katz LLC

(57) ABSTRACT

A method of a first user equipment (UE) according to an embodiment of the present disclosure includes pairing a first transmission beam of the first UE and a second reception beam of a second UE on the basis of transmission of a sidelink synchronization signal block (S-SSB). The method also includes receiving a preamble among preambles included in a preamble group among two or more preamble groups through a first channel by using a first reception beam of the first UE, where the first reception beam corresponds to the first transmission beam paired with the second reception beam. The method additionally includes transmitting a beam access response (BAR) based on the received pre-
(Continued)

amble to the second UE by using the first transmission beam, wherein the two or more preamble groups are determined on the basis of a length of a cyclic prefix (CP) added to a preamble.

20 Claims, 12 Drawing Sheets

(51) Int. Cl.
*H04W 56/00* (2009.01)
*H04W 74/0833* (2024.01)

(56) References Cited

U.S. PATENT DOCUMENTS

| | | | | |
|---|---|---|---|---|
| 2019/0349873 | A1* | 11/2019 | Ohara | H04L 43/16 |
| 2021/0037534 | A1 | 2/2021 | Ji | |
| 2021/0352625 | A1* | 11/2021 | Akkarakaran | H04B 7/06954 |
| 2021/0410221 | A1 | 12/2021 | Zhang | |
| 2023/0040458 | A1 | 2/2023 | Ji | |

OTHER PUBLICATIONS

International Search Report and Written Opinion cited in corresponding international patent application No. PCT/KR2023/001201; May 3, 2023; 8 pp.
ZTE et al., Discussion on Rel-18 Sidelink enhancements, RP-213391, 3GPP TSG RAN Meeting #94-e, Electronic Meeting. Nov. 29, 2021., 4pp.

* cited by examiner

METHOD AND DEVICE FOR INITIAL BEAM ACCESS BETWEEN TERMINALS IN SIDELINK COMMUNICATION

CROSS-REFERENCE TO RELATED APPLICATION

This application is a continuation application of International Application No. PCT/KR2023/001201, filed on Jan. 26, 2023, which claims priority from Korean Patent Application No. 10-2022-0013535 filed on Jan. 28, 2022, the disclosures of each of which are incorporated by reference herein in their entirety.

TECHNICAL FIELD

The present disclosure relates to a sidelink communication technique, and more particularly, to a technique for initial beam access in sidelink communication.

BACKGROUND

A communication network (e.g., 5G communication network or 6G communication network) is being developed to provide enhanced communication services compared to the existing communication networks (e.g., long term evolution (LTE), LTE-Advanced (LTE-A), etc.). The 5G communication network (e.g., New Radio (NR) communication network) can support frequency bands both below 6 GHz and above 6 GHz. In other words, the 5G communication network can support both a frequency region 1 (FR1) and/or FR2 bands. Compared to the LTE communication network, the 5G communication network can support various communication services and scenarios. For example, usage scenarios of the 5G communication network may include enhanced Mobile BroadBand (eMBB), Ultra Reliable Low Latency Communication (URLLC), massive Machine Type Communication (mMTC), and the like.

The 6G communication network can support a variety of communication services and scenarios compared to the 5G communication network. The 6G communication network can meet the requirements of hyper-performance, hyper-bandwidth, hyper-space, hyper-precision, hyper-intelligence, and/or hyper-reliability. The 6G communication network can support diverse and wide frequency bands and can be applied to various usage scenarios such as terrestrial communication, non-terrestrial communication, sidelink communication, and the like.

In the current SL communication, a synchronization acquisition process for the NR system in the FR1 band involves receiving synchronization signals from a base station, satellite, or terminal. In this case, a terminal that is not a transmitting user equipment (TX-UE) intending to transmit data to a specific receiving user equipment (RX-UE) may still act as the terminal transmitting synchronization signals.

However, methods for SL communication in the FR2 band of the NR system have not yet been defined in the standards. In the case of SL communication in the FR2 band, data transmission and reception are possible once beam pairing has been established between the transmitting and receiving terminals. Therefore, synchronization and initial beam pairing should be completed before data transmission and reception. Consequently, to enable SL communication in both the FR2 and FR1 bands of the NR system through beam pairing, methods should be developed for synchronization acquisition and initial beam pairing between transmitting and receiving terminals.

SUMMARY

The present disclosure for resolving the above-described problem is directed to providing a method and an apparatus for initial beam access in sidelink communication.

According to an embodiment, a method of a first user equipment (UE) is provided. The method includes pairing a second reception beam of a second UE and a first transmission beam of the first UE based on transmission of a sidelink synchronization signal block (S-SSB). The method also includes receiving one preamble among preambles included in one preamble group of two or more preamble groups through a first channel, by using a first reception beam of the first UE corresponding to the first transmission beam paired with the second reception beam. The method additionally includes transmitting a beam access response (BAR) based on the received one preamble to the second UE using the first transmission beam, wherein the two or more preamble groups are determined based on lengths of cyclic prefixes (CPs) added to preambles.

A resource of the first channel may be associated with a transmission slot of the S-SSB and may be configured within a range of a frequency region for transmitting the S-SSB based on a subcarrier spacing (SCS).

The resource of the first channel may be configured as a predetermined number of slots starting from a slot after an N-th slot from a transmission slot of a last S-SSB within a transmission period of the S-SSB, through at least one of higher layer signaling, radio resource control (RRC) signaling, medium access control (MAC) control element (CE), or system information (SI), and N may be a natural number.

Each of the two or more preamble groups may be configured with at least one preamble format used in a physical random access channel (PRACH) based on CP length(s) or preamble length(s), and information of the two or more preamble groups may be preconfigured using at least one of RRC signaling, MAC CE, or SI.

The BAR may include at least one of information on the received one preamble, timing correction information based on a reception timing of the received one preamble, information on a frequency and time resource to be used for message transmission of the second UE, information on an identifier (ID) of the first UE, information on an ID of a UE to which the first UE wishes to transmit data, or a data transmit indicator (DTI).

The method may further include, in response to transmission of the BAR, receiving, from the second UE, control information for reception of a beam access (BA) message through a physical sidelink control channel (PSCCH); and receiving the BA message through a physical sidelink shared channel (PSSCH) based on the received PSCCH.

The BA message may include at least one of information on an identifier (ID) of the second UE, configuration information of a beam of the second UE used for sidelink communication between the second UE and the first UE, information indicating whether an error occurs in the BAR, or information indicating that the second UE is a sidelink communication UE.

The method may further include in response to the BA message including data transmitted from the second UE to the first UE, transmitting a response message corresponding to the BA message.

According to another embodiment, a first user equipment (UE) is provided. The first UE includes processor configured to cause the first UE to pair a second reception beam of a second UE and a first transmission beam of the first UE based on transmission of a sidelink synchronization signal block (S-SSB). The processor is also configured to cause the first UE to receive one preamble among preambles included in one preamble group of two or more preamble groups through a first channel, by using a first reception beam of the first UE corresponding to the first transmission beam paired with the second reception beam. The processor is additionally configured to cause the first UE to transmitting a beam access response (BAR) based on the received one preamble to the second UE using the first transmission beam, wherein the two or more preamble groups are determined based on lengths of cyclic prefixes (CPs) added to preambles.

A resource of the first channel may be associated with a transmission slot of the S-SSB and may be configured within a range of a frequency region for transmitting the S-SSB based on a subcarrier spacing (SCS).

The resource of the first channel may be configured as a predetermined number of slots starting from a slot after an N-th slot from a transmission slot of a last S-SSB within a transmission period of the S-SSB, through at least one of higher layer signaling, radio resource control (RRC) signaling, medium access control (MAC) control element (CE), or system information (SI), and N may be a natural number.

Information of the two or more preamble groups may be preconfigured using at least one of RRC signaling, MAC CE, or SI.

The BAR may include at least one of information on the received one preamble, timing correction information based on a reception timing of the received one preamble, information on a frequency and time resource to be used for message transmission of the second UE, information on an identifier (ID) of the first UE, information on an ID of a UE to which the first UE wishes to transmit data, or a data transmit indicator (DTI).

The processor may further be configured to cause the first UE to, in response to transmission of the BAR, receive, from the second UE, control information for reception of a beam access (BA) message through a physical sidelink control channel (PSCCH); and receiving the BA message through a physical sidelink shared channel (PSSCH) based on the received PSCCH.

The BA message may include at least one of information on an identifier (ID) of the second UE, configuration information of a beam of the second UE used for sidelink communication between the second UE and the first UE, information indicating whether an error occurs in the BAR, or information indicating that the second UE is a sidelink communication UE.

The processor may further be configured to cause the first UE to, in response to the BA message including data transmitted from the second UE to the first UE, transmit a response message corresponding to the BA message.

According to yet another embodiment, a method of a second user equipment (UE) is provided. The method includes pairing a first transmission beam of a first UE and a second reception beam of the second UE based on transmission of a sidelink synchronization signal block (S-SSB). The method also includes transmitting, to the first UE, one preamble among preambles included in one preamble group of two or more preamble groups through a first channel, by using a first transmission beam of the second UE corresponding to the second reception beam paired with the first transmission beam of the first UE. The method additionally includes receiving, from the first UE, a beam access response (BAR) for the transmitted one preamble using the second reception beam, wherein the two or more preamble groups are determined based on lengths of cyclic prefixes (CPs) added to preambles.

A resource of the first channel may be associated with a transmission slot of the S-SSB and may be configured within a range of a frequency region for transmitting the S-SSB based on a subcarrier spacing (SCS).

The resource of the first channel may be configured as a predetermined number of slots starting from a slot after an N-th slot from a transmission slot of a last S-SSB within a transmission period of the S-SSB, through at least one of higher layer signaling, radio resource control (RRC) signaling, medium access control (MAC) control element (CE), or system information (SI), and N may be a natural number.

Information of the two or more preamble groups may be preconfigured using at least one of RRC signaling, MAC CE, or SI.

According to embodiments of the present disclosure, smooth sidelink communication can be achieved through synchronization acquisition and beam pairing. Furthermore, by defining a beam access procedure for sidelink communication, an access procedure can be smoothly performed using initial beams.

DETAILED DESCRIPTION

Figure 1:
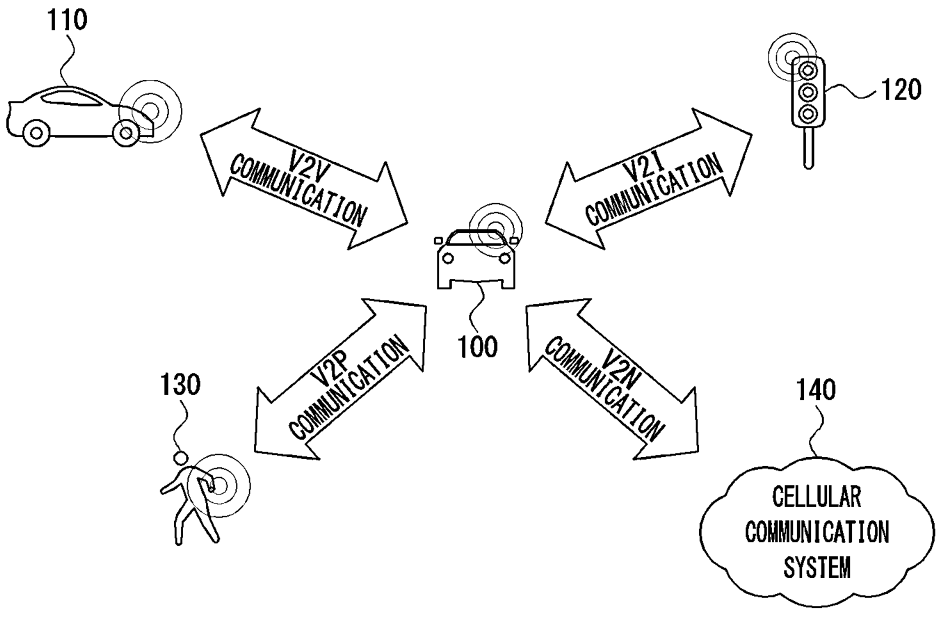
FIG. 1 is a conceptual diagram illustrating scenarios of Vehicle-to-Everything (V2X) communications, according to an embodiment of the present disclosure.

Since the present disclosure may be variously modified and have several forms, specific example embodiments are shown in the accompanying drawings and described in detail in the description below. It should be understood, however, that it is not intended to limit the present disclosure to the specific example embodiments. On the contrary, the present disclosure is intended to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the present disclosure, '(re)transmission' may refer to 'transmission', 'retransmission', or 'transmission and retransmission', '(re)configuration' may refer to 'configuration', 'reconfiguration', or 'configuration and reconfiguration', '(re)connection' may refer to 'connection', 'reconnection', or 'connection and reconnection', and '(re)access' may refer to 'access', 're-access', or 'access and re-access'.

When it is mentioned that a certain component is "coupled with" or "connected with" another component, it should be understood that the certain component may be directly "coupled with" or "connected with" to the other component or a further component may be disposed therebetween. In contrast, when it is mentioned that a certain component is "directly coupled with" or "directly connected with" another component, it should be understood that a further component is not disposed therebetween.

The terms used in the present disclosure are only used to describe example embodiments, and are not intended to limit the present disclosure. The singular expression includes the plural expression unless the context clearly dictates otherwise. In the present disclosure, terms such as 'comprise', 'include', or 'have' are intended to designate that a feature, number, step, operation, component, part, or combination thereof described in the specification is present. However, it should be understood that the terms do not preclude presence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

When a component, device, element, or the like of the present disclosure is described as having a purpose or performing an operation, function, or the like, the component, device, or element should be considered herein as being "configured to" meet that purpose or perform that operation or function.

Hereinafter, embodiments of the present disclosure are described in detail with reference to the accompanying drawings. In describing the disclosure, to facilitate understanding of the disclosure, like numbers refer to like elements throughout the description of the figures and the repetitive description thereof have been omitted. The operations according to embodiments described explicitly in the present disclosure, as well as combinations of the described embodiments, extensions of the described embodiments, and/or variations of the described embodiments, may be performed. Some operations may be omitted and/or a sequence of operations may be altered.

When a method (e.g., transmission or reception of a signal) performed at a first communication node among communication nodes is described in the present disclosure, it should be understood that a corresponding second communication node may perform a method (e.g., reception or transmission of the signal) corresponding to the method performed at the first communication node. For example, when an operation of a user equipment (UE) is described, a base station corresponding thereto may perform an operation corresponding to the operation of the UE. Conversely, when an operation of a base station is described, a corresponding UE may perform an operation corresponding to the operation of the base station.

The base station may be referred to by various terms such as NodeB, evolved NodeB, next generation node B (gNodeB), gNB, device, apparatus, node, communication node, base transceiver station (BTS), radio remote head (RRH), transmission reception point (TRP), radio unit (RU), roadside unit (RSU), radio transceiver, access point, access node, and the like. The user equipment (UE) may be referred to by various terms such as terminal, device, apparatus, node, communication node, end node, access terminal, mobile terminal, station, subscriber station, mobile station, portable subscriber station, on-board unit (OBU), and the like.

In embodiments of the present disclosure, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or sidelink control information (SCI)).

In the present disclosure, 'configuration of an operation (e.g., transmission operation)' may refer to signaling of configuration information (e.g., information elements, parameters) required for the operation and/or information indicating to perform the operation. In the present disclosure, 'configuration of information elements (e.g., parameters)' may refer to signaling of the information elements. In the present disclosure, 'signal and/or channel' may refer to signal, channel, or both signal and channel, and 'signal' may be used to mean 'signal and/or channel'.

A communication network to which embodiments are applied is not limited to that described below, and the embodiments may be applied to various communication networks (e.g., 4G communication networks, 5G communication networks, and/or 6G communication networks). Here, 'communication network' may be used interchangeably with a term 'communication system'.

FIG. 1 is a conceptual diagram illustrating scenarios of Vehicle-to-Everything (V2X) communications, according to an embodiment of the present disclosure.

As shown in FIG. 1, V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a communication system (e.g., communication network) 140, and the V2X communications supported by the communication system 140 may be referred to as 'Cellular-V2X (C-V2X) communications'. The communication system 140 may include the 4G communication system (e.g., LTE communication system or LTE-A communication system), 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported by the communication system 140 may be performed based on sidelink communication technologies (e.g., Proximity Based Services (ProSe) and Device-to-Device (D2D) communication technologies, and the like). In this case, the communications between the vehicles 100 and 110 may be performed using at least one sidelink channel.

The V2I communications may include communications between the first vehicle 100 and an infrastructure (e.g., roadside unit (RSU)) 120 located on a roadside. The infrastructure 120 may include a traffic light or a streetlight that is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported by the communication system 140 may be performed based on sidelink communication technologies (e.g., ProSe and D2D communication technologies, and the like). In this case, the communications between the vehicle 100 and the infrastructure 120 may be performed using at least one sidelink channel.

The V2P communications may include communications between the first vehicle 100 (e.g., the communication node located in the vehicle 100) and a person 130 (e.g., a communication node carried by the person 130). The driving information of the first vehicle 100 and movement information of the person 130, such as velocity, heading, time, position, and the like, may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported by the communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel.

The V2N communications may be communications between the first vehicle 100 (e.g., the communication node located in the vehicle 100) and the communication system (e.g., communication network) 140. The V2N communications may be performed based on the 4G communication technology (e.g., LTE or LTE-A specified as the 3GPP standards) or the 5G communication technology (e.g., NR specified as the 3GPP standards). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, a Wireless Personal Area Network (WPAN) communication technology defined in IEEE 802.15, or the like.

In various embodiment, the communication system 140 supporting the V2X communications may be configured as follows.

Figure 2:
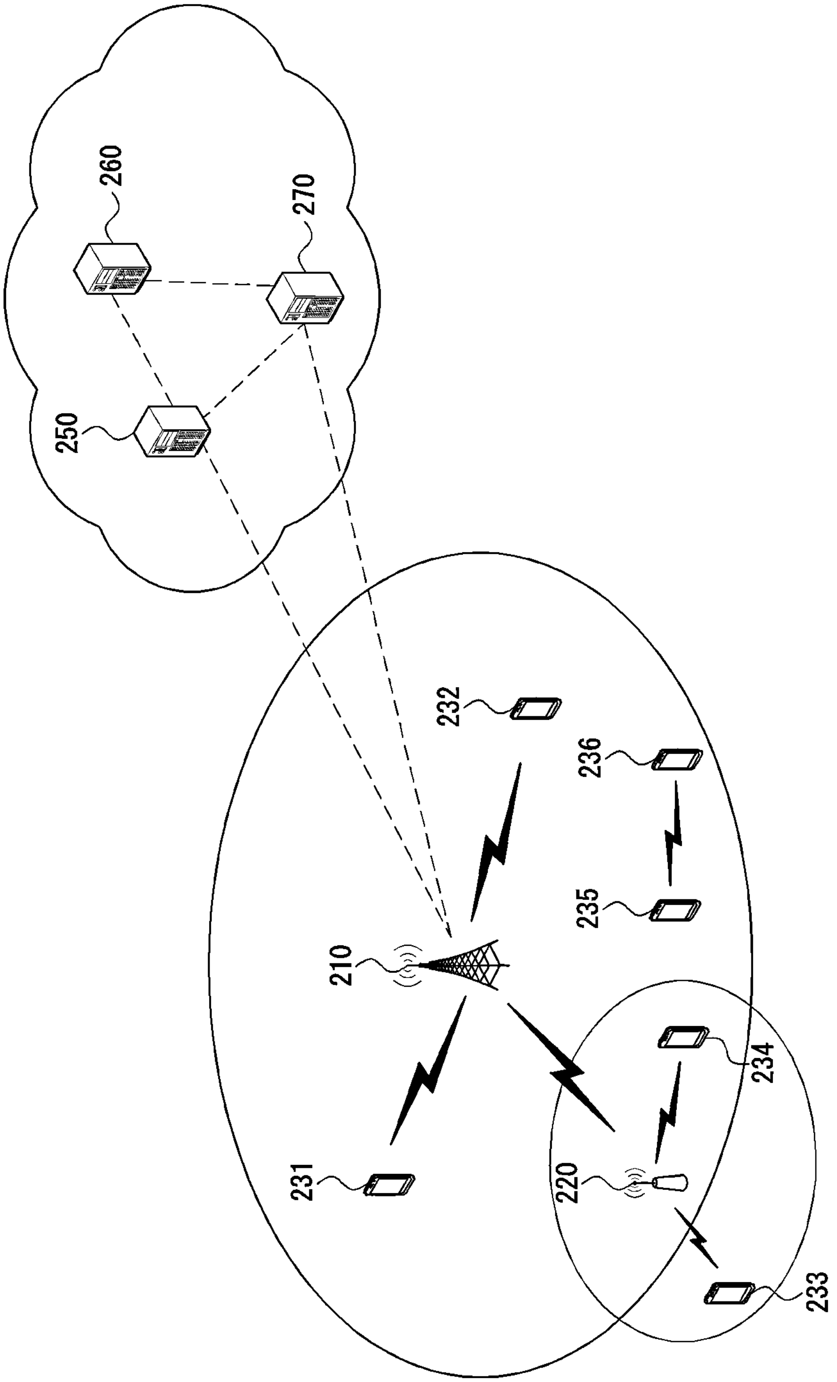
FIG. 2 is a conceptual diagram illustrating a first embodiment of a communication system.

FIG. 2 is a conceptual diagram illustrating a first embodiment of a communication system.

As shown in FIG. 2, a communication system may include an access network, a core network, and the like. The access network may include a base station 210, a relay 220, user equipment (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the communication system supports the 4G communication technology, the core network may include a serving gateway (S-GW) 250, a packet data network (PDN) gateway (P-GW) 260, a mobility management entity (MME) 270, and the like.

When the communication system supports the 5G communication technology, the core network may include a user plane function (UPF) 250, a session management function (SMF) 260, an access and mobility management function (AMF) 270, and the like. Alternatively, when the communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slices configured in the core network.

The communication nodes (e.g., base station, relay, UE, S-GW, P-GW, MME, UPF, SMF, AMF, etc.) constituting the communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) constituting the communication system may be configured as follows.

Figure 3:
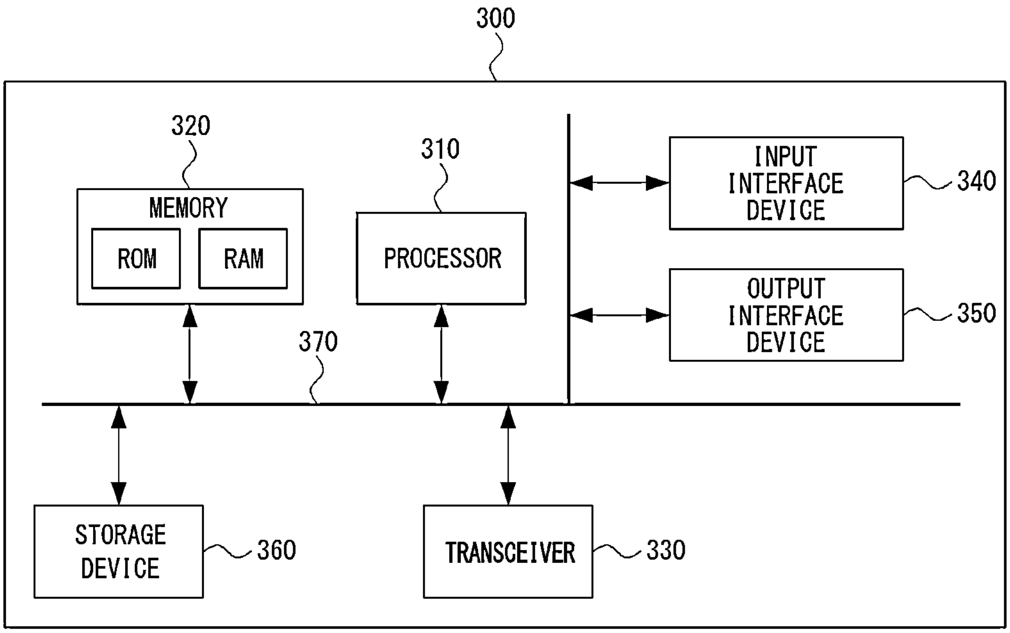
FIG. 3 is a conceptual diagram illustrating a first embodiment of a communication node constituting a communication system.

FIG. 3 is a conceptual diagram illustrating a first embodiment of a communication node constituting a communication system.

As shown in FIG. 3, a communication node 300 may comprise at least one processor 310, a memory 320, and a transceiver 330 connected to a network for performing communications. The communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one program command stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell. The base station 210 may be connected to the core network via an ideal backhaul or a non-ideal backhaul. The base station 210 may transmit signals received from the core network to the UEs 231 through 236 and the relay 220 and may transmit signals received from the UEs 231 through 236 and the relay 220 to the core network. The UEs 231, 232, 234, 235 and 236 may belong to a cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. For example, the relay 220 may transmit signals received from the base station 210 to the UEs 233 and 234 and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. The UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

The base station 210 may be referred to as a Node B (NB), evolved Node B (eNB), base transceiver station (BTS), radio remote head (RRH), transmission reception point (TRP), radio unit (RU), roadside unit (RSU), radio transceiver, access point, access node, or the like. The relay 220 may be referred to as a small base station, relay node, or the like. Each of the UEs 231 through 236 may be referred to as a terminal, access terminal, mobile terminal, station, subscriber station, mobile station, portable subscriber station, node, device, on-broad unit (OBU), or the like.

In various embodiments, communication nodes that perform communications in the communication network may be configured as follows. A communication node shown in FIG. 4 may be a specific embodiment of the communication node shown in FIG. 3.

Figure 4:
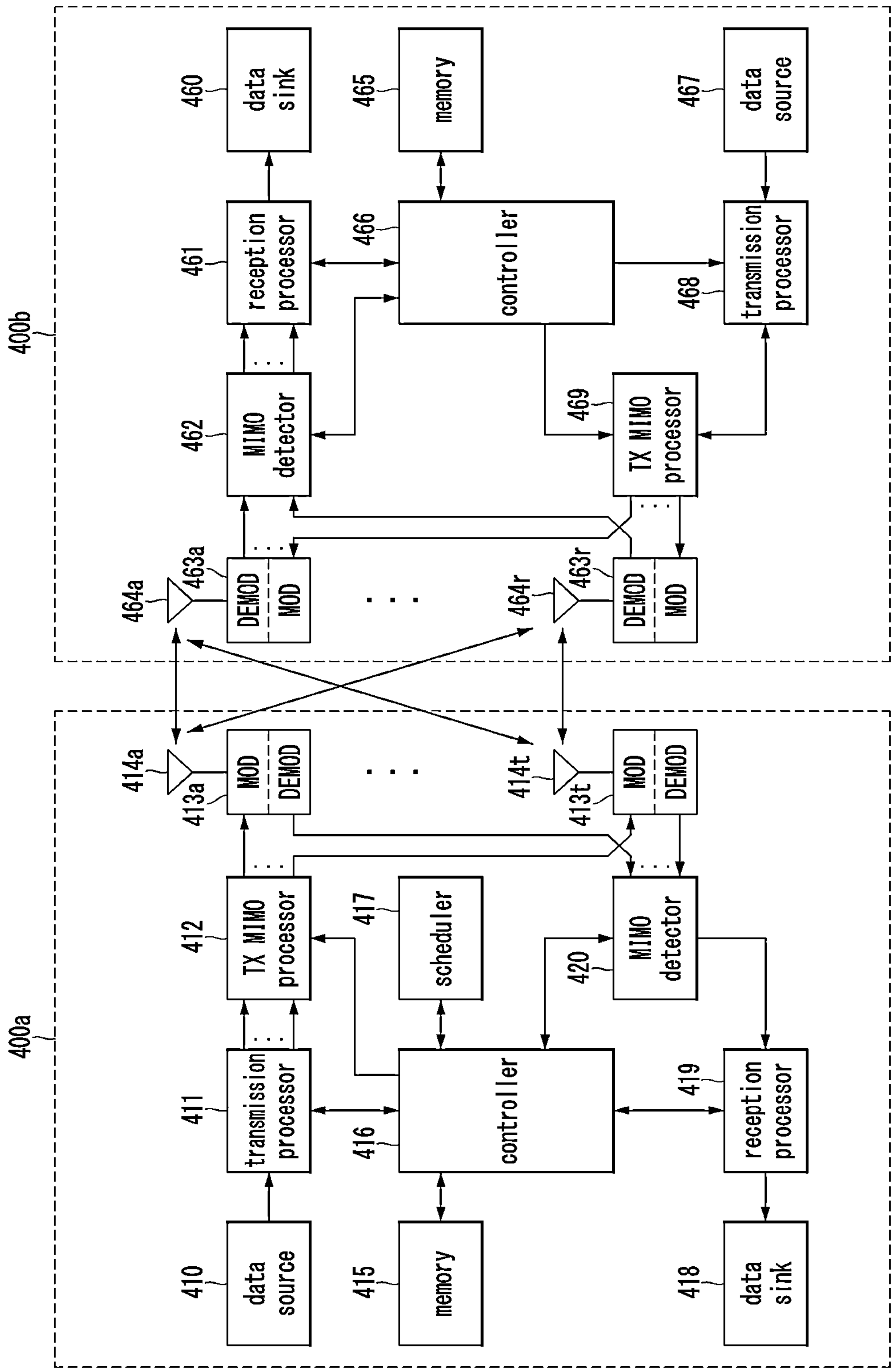
FIG. 4 is a block diagram illustrating a first embodiment of communication nodes performing communication.

FIG. 4 is a block diagram illustrating a first embodiment of communication nodes performing communication.

As shown in FIG. 4, each of a first communication node 400*a* and a second communication node 400*b* may be a base station or UE. The first communication node 400*a* may transmit a signal to the second communication node 400*b*. A transmission processor 411 included in the first communication node 400*a* may receive data (e.g., a data unit) from a data source 410. The transmission processor 411 may receive control information from a controller 416. The control information may include at least one of system information, RRC configuration information (e.g., information configured by RRC signaling), MAC control information (e.g., MAC CE), or PHY control information (e.g., DCI, SCI).

The transmission processor 411 may generate data symbol(s) by performing processing operations (e.g., encoding operation, symbol mapping operation, etc.) on the data. The transmission processor 411 may generate control symbol(s) by performing processing operations (e.g., encoding operation, symbol mapping operation, etc.) on the control information. In addition, the transmission processor 411 may generate synchronization/reference symbol(s) for synchronization signals and/or reference signals.

A Tx MIMO processor 412 may perform spatial processing operations (e.g., precoding operations) on the data symbol(s), control symbol(s), and/or synchronization/reference symbol(s). An output (e.g., a symbol stream) of the Tx MIMO processor 412 may be provided to modulators (MODs) included in transceivers 413*a* to 413*t*. The modulator may generate modulation symbols by performing processing operations on the symbol stream and may generate signals by performing additional processing operations (e.g., analog conversion operations, amplification operation, filtering operation, up-conversion operation, etc.) on the modulation symbols. The signals generated by the modulators of the transceivers 413*a* to 413*t* may be transmitted through antennas 414*a* to 414*t*.

The signals transmitted by the first communication node 400*a* may be received at antennas 464*a* to 464*r* of the second communication node 400*b*. The signals received at the antennas 464*a* to 464*r* may be provided to demodulators (DEMODs) included in transceivers 463*a* to 463*r*. The demodulator (DEMOD) may obtain samples by performing processing operations (e.g., filtering operation, amplification operation, down-conversion operation, digital conversion operation, etc.) on the signals. The demodulator may perform additional processing operations on the samples to obtain symbols. A MIMO detector 462 may perform MIMO detection operations on the symbols. A reception processor 461 may perform processing operations (e.g., de-interleaving operation, decoding operation, etc.) on the symbols. An output of the reception processor 461 may be provided to a data sink 460 and a controller 466. For example, the data may be provided to the data sink 460 and the control information may be provided to the controller 466.

The second communication node 400*b* may transmit signals to the first communication node 400*a*. A transmission processor 469 included in the second communication node 400*b* may receive data (e.g., a data unit) from a data source 467 and perform processing operations on the data to generate data symbol(s). The transmission processor 468 may receive control information from the controller 466 and perform processing operations on the control information to generate control symbol(s). In addition, the transmission processor 468 may generate reference symbol(s) by performing processing operations on reference signals.

A Tx MIMO processor 469 may perform spatial processing operations (e.g., precoding operations) on the data symbol(s), control symbol(s), and/or reference symbol(s). An output (e.g., a symbol stream) of the Tx MIMO processor 469 may be provided to modulators (MODs) included in the transceivers 463*a* to 463*t*. The modulator may generate modulation symbols by performing processing operations on the symbol stream and may generate signals by performing additional processing operations (e.g., analog conversion operation, amplification operation, filtering operation, up-conversion operations) on the modulation symbols. The signals generated by the modulators of the transceivers 463*a* to 463*t* may be transmitted through the antennas 464*a* to 464*t*.

The signals transmitted by the second communication node 400*b* may be received at the antennas 414*a* to 414*r* of the first communication node 400*a*. The signals received at the antennas 414*a* to 414*r* may be provided to demodulators (DEMODs) included in the transceivers 413*a* to 413*r*. The demodulator may obtain samples by performing processing operations (e.g., filtering operation, amplification operation, down-conversion operation, digital conversion operation) on the signals. The demodulator may perform additional processing operations on the samples to obtain symbols. A MIMO detector 420 may perform a MIMO detection operation on the symbols. The reception processor 419 may perform processing operations (e.g., de-interleaving operation, decoding operation, etc.) on the symbols. An output of the reception processor 419 may be provided to a data sink 418 and the controller 416. For example, the data may be provided to the data sink 418 and the control information may be provided to the controller 416.

Memories 415 and 465 may store the data, control information, and/or program codes. A scheduler 417 may perform scheduling operations for communication. The processors 411, 412, 419, 461, 468, and 469 and the controllers 416 and 466 shown in FIG. 4 may correspond to the processor 310 shown in FIG. 3 and may be used to perform methods according to embodiments of the present disclosure.

Figure 5A:
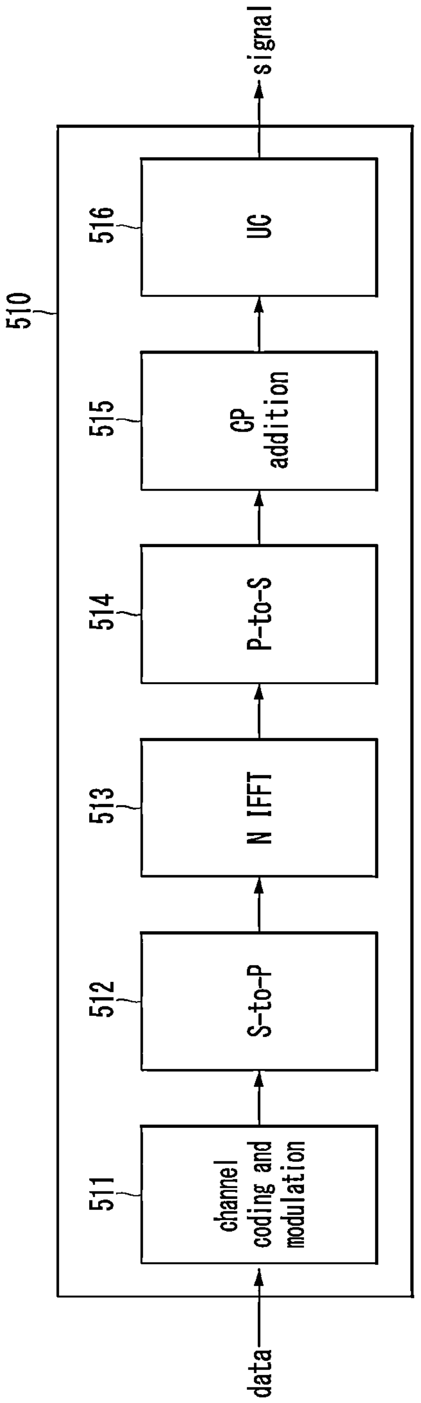
FIG. 5A is a block diagram illustrating a first embodiment of a transmission path.
Figure 5B:
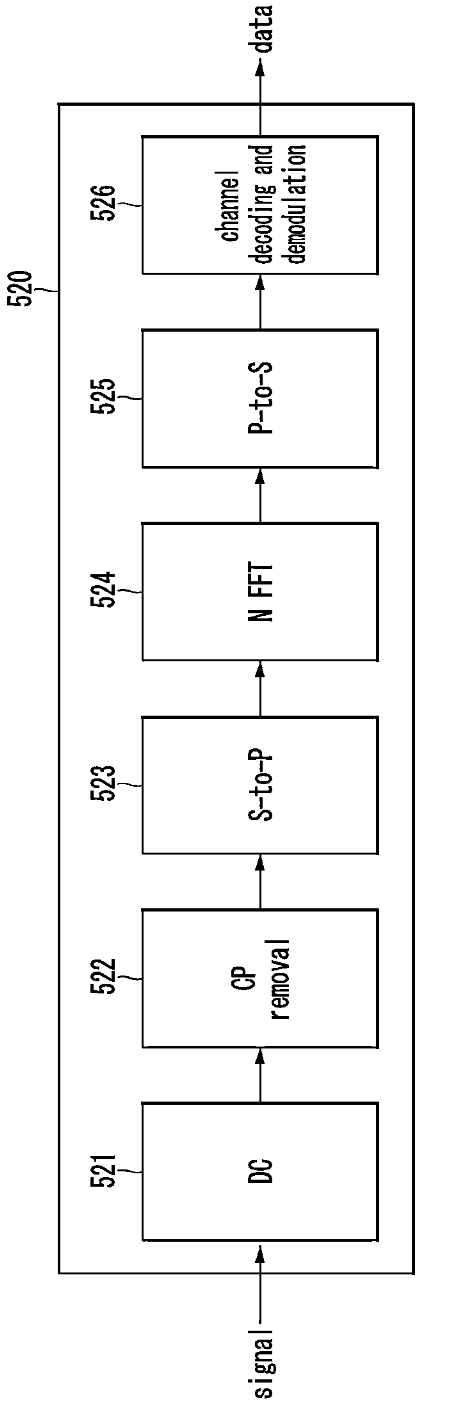
FIG. 5B is a block diagram illustrating a first embodiment of a reception path.

FIG. 5A is a block diagram illustrating a first embodiment of a transmission path. FIG. 5B is a block diagram illustrating a first embodiment of a reception path.

As shown in FIGS. 5A and 5B, a transmission path 510 may be implemented in a communication node that transmits signals, and a reception path 520 may be implemented in a communication node that receives signals. The transmission path 510 may include a channel coding and modulation block 511, a serial-to-parallel (S-to-P) block 512, an N-point inverse fast Fourier transform (N-point IFFT) block 513, a parallel-to-serial (P-to-S) block 514, a cyclic prefix (CP) addition block 515, and up-converter (UC) 516. The reception path 520 may include a down-converter (DC) 521, a CP removal block 522, an S-to-P block 523, an N-point FFT block 524, a P-to-S block 525, and a channel decoding and demodulation block 526. Here, N may be a natural number.

In the transmission path 510, information bits may be input to the channel coding and modulation block 511. The channel coding and modulation block 511 may perform a coding operation (e.g., low-density parity check (LDPC) coding operation, polar coding operation, etc.) and a modulation operation (e.g., Quadrature Phase Shift Keying (QPSK), Quadrature Amplitude Modulation (QAM), etc.) on the information bits. An output of the channel coding and modulation block 511 may be a sequence of modulation symbols.

The S-to-P block 512 may convert frequency domain modulation symbols into parallel symbol streams to generate N parallel symbol streams. N may be the IFFT size or the FFT size. The N-point IFFT block 513 may generate time domain signals by performing an IFFT operation on the N parallel symbol streams. The P-to-S block 514 may convert the output (e.g., parallel signals) of the N-point IFFT block 513 to serial signals to generate the serial signals.

The CP addition block 515 may insert a CP into the signals. The UC 516 may up-convert a frequency of the output of the CP addition block 515 to a radio frequency (RF) frequency. Further, the output of the CP addition block 515 may be filtered in baseband before the up-conversion.

The signal transmitted from the transmission path 510 may be input to the reception path 520. Operations in the reception path 520 may be reverse operations of the operations in the transmission path 510. The DC 521 may down-convert a frequency of the received signals to a baseband frequency. The CP removal block 522 may remove a CP from the signals. The output of the CP removal block 522 may be serial signals. The S-to-P block 523 may convert the serial signals into parallel signals. The N-point FFT block 524 may generate N parallel signals by performing an FFT algorithm. The P-to-S block 525 may convert the parallel signals into a sequence of modulation symbols. The channel decoding and demodulation block 526 may perform a demodulation operation on the modulation symbols and may restore data by performing a decoding operation on a result of the demodulation operation.

In FIGS. 5A and 5B, discrete Fourier transform (DFT) and inverse DFT (IDFT) may be used instead of FFT and IFFT. Each of the blocks (e.g., components) in FIGS. 5A and 5B may be implemented by at least one of hardware, software, or firmware. For example, some blocks in FIGS. 5A and 5B may be implemented by software, and other blocks may be implemented by hardware or a combination of hardware and software. In FIGS. 5A and 5B, one block may be subdivided into a plurality of blocks, a plurality of blocks may be integrated into one block, some blocks may be omitted, and blocks supporting other functions may be added.

In embodiments, communications between the UEs 235 and 236 may be performed based on sidelink communication technology (e.g., ProSe communication technology, D2D communication technology). The sidelink communication may be performed based on a one-to-one scheme or a one-to-many scheme. When V2V communication is performed using sidelink communication technology, the UE 235 may refer to a communication node located in the first vehicle 100 of FIG. 1, and the UE 236 may refer to a communication node located in the second vehicle 110 of FIG. 1. When V2I communication is performed using sidelink communication technology, the UE 235 may refer to a communication node located in the first vehicle 100 of FIG. 1, and the UE 236 may refer to a communication node located in the infrastructure 120 of FIG. 1. When V2P communication is performed using sidelink communication technology, the UE 235 may refer to a communication node located in the first vehicle 100 of FIG. 1, and the UE 236 may refer to a communication node carried by the person 130.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

In various embodiments, a user plane protocol stack of the UEs (e.g., the UEs 235 and 236) performing sidelink communications may be configured as follows.

Figure 6:
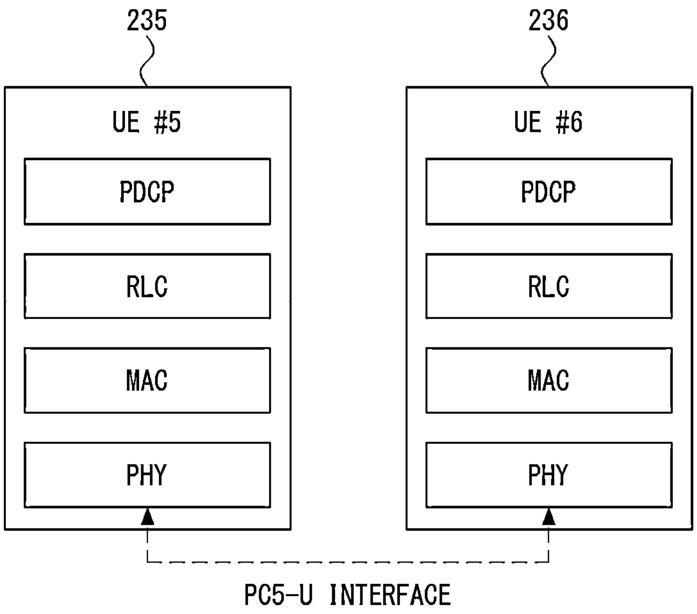
FIG. 6 is a block diagram illustrating a first embodiment of a user plane protocol stack of a UE performing sidelink communication.

FIG. 6 is a block diagram illustrating a first embodiment of a user plane protocol stack of a UE performing sidelink communication.

As shown in FIG. 6, the UE 235 may be the UE 235 shown in FIG. 2 and the UE 236 may be the UE 236 shown in FIG. 2. The scenario for the sidelink communications between the UEs 235 and 236 may be one of the sidelink communication scenarios A to D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications. Also, in the sidelink communications, a hybrid automatic repeat request (HARQ) feedback operation may be supported, and an RLC acknowledged mode (RLC AM) or an RLC unacknowledged mode (RLC UM) may be supported.

In various embodiments, a control plane protocol stack of the UEs (e.g., the UEs 235 and 236) performing sidelink communications may be configured as follows.

Figure 7:
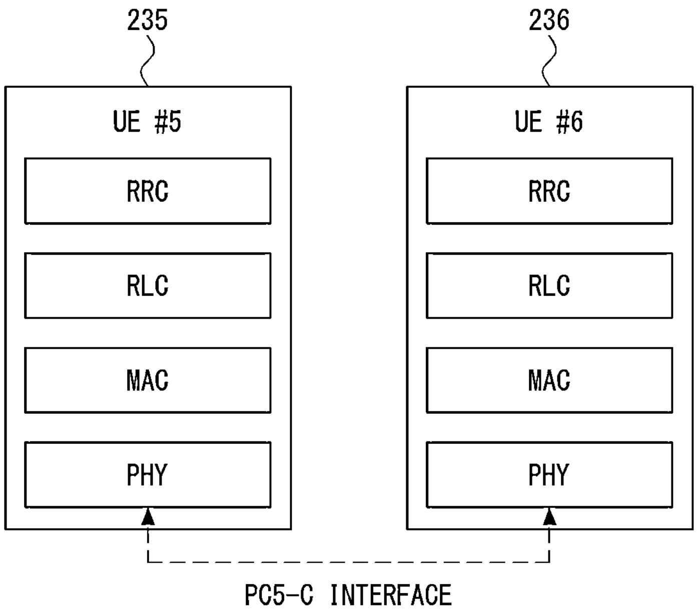
FIG. 7 is a block diagram illustrating a first embodiment of a control plane protocol stack of a UE performing sidelink communication.
Figure 8:
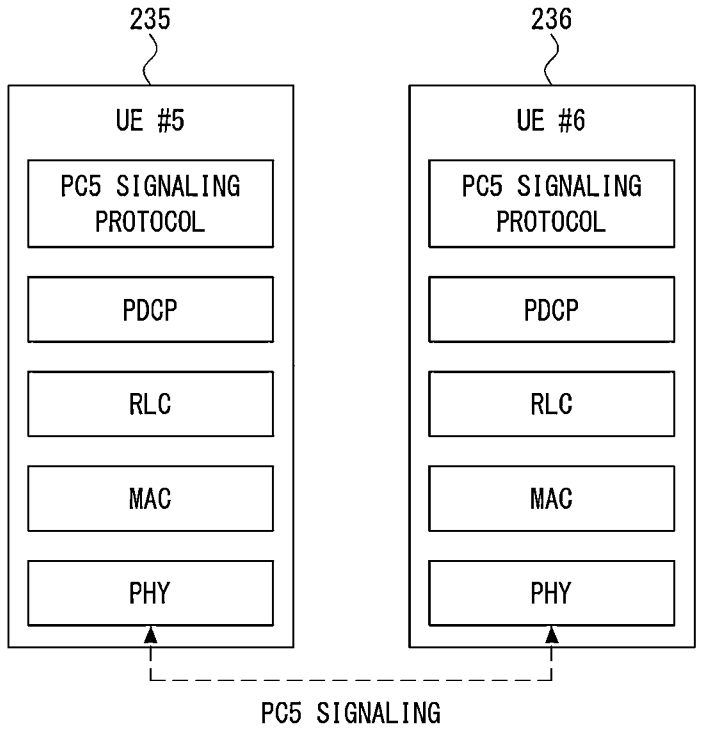
FIG. 8 is a block diagram illustrating a second embodiment of a control plane protocol stack of a UE performing sidelink communication.

FIG. 7 is a block diagram illustrating a first embodiment of a control plane protocol stack of a UE performing sidelink communication, and FIG. 8 is a block diagram illustrating a second embodiment of a control plane protocol stack of a UE performing sidelink communication.

As shown in FIGS. 7 and 8, the UE 235 may be the UE 235 shown in FIG. 2 and the UE 236 may be the UE 236 shown in FIG. 2. The scenario for the sidelink communications between the UEs 235 and 236 may be one of the sidelink communication scenarios A to D of Table 1. The control plane protocol stack illustrated in FIG. 7 may be a control plane protocol stack for transmission and reception of broadcast information (e.g., Physical Sidelink Broadcast Channel (PSBCH)).

The control plane protocol stack shown in FIG. 7 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 8 may be a control plane protocol stack for one-to-one sidelink communication. The control plane protocol stack shown in FIG. 8 may include a PHY layer, a MAC layer, an RLC layer, a PDCP layer, and a PC5 signaling protocol layer.

Channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by higher layer signaling. The PSCCH may be used for transmitting and receiving sidelink control information (SCI) and may also be configured in the UE (e.g., UE 235 or 236) by higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

A sidelink transmission mode (TM) may be classified into sidelink TMs 1 to 4 as shown below in Table 2.

TABLE 2

| Sidelink TM | Description |
|---|---|
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, sidelink communication methods, according to various embodiment, are described. When a method (e.g., transmission or reception of a signal) performed at a first communication node among communication nodes is described, it should be understood that a corresponding second communication node may perform a method (e.g., reception or transmission of the signal) corresponding to the method performed at the first communication node. For example, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In embodiments described below, an operation of a vehicle may be an operation of a communication node located in the vehicle.

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell-specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

The base station may transmit system information (e.g., SIB12, SIB13, SIB14) and RRC messages including configuration information for sidelink communication (i.e., sidelink configuration information) to UE(s). The UE may receive the system information and RRC messages from the base station, identify the sidelink configuration information included in the system information and RRC messages, and perform sidelink communication based on the sidelink configuration information. The SIB12 may include sidelink communication/discovery configuration information. The SIB13 and SIB14 may include configuration information for V2X sidelink communication.

The sidelink communication may be performed within an SL bandwidth part (BWP). The base station may configure SL BWP(s) to the UE using higher layer signaling. The higher layer signaling may include SL-BWP-Config and/or SL-BWP-ConfigCommon. SL-BWP-Config may be used to configure a SL BWP for UE-specific sidelink communication. SL-BWP-ConfigCommon may be used to configure cell-specific configuration information.

Furthermore, the base station may configure resource pool(s) to the UE using higher layer signaling. The higher layer signaling may include SL-BWP-PoolConfig, SL-BWP-PoolConfigCommon, SL-BWP-DiscPoolConfig, and/or SL-BWP-DiscPoolConfigCommon. SL-BWP-PoolConfig may be used to configure a sidelink communication resource pool. SL-BWP-PoolConfigCommon may be used to configure a cell-specific sidelink communication resource pool. SL-BWP-DiscPoolConfig may be used to configure a resource pool dedicated to UE-specific sidelink discovery. SL-BWP-DiscPoolConfigCommon may be used to configure a resource pool dedicated to cell-specific sidelink discovery. The UE may perform sidelink communication within the resource pool configured by the base station.

The sidelink communication may support SL discontinuous reception (DRX) operations. The base station may transmit a higher layer message (e.g., SL-DRX-Config) including SL DRX-related parameter(s) to the UE. The UE may perform SL DRX operations based on SL-DRX-Config received from the base station. The sidelink communication may support inter-UE coordination operations. The base station may transmit a higher layer message (e.g., SL-InterUE-CoordinationConfig) including inter-UE coordination parameter(s) to the UE. The UE may perform inter-UE coordination operations based on SL-InterUE-Coordination-Config received from the base station.

The sidelink communication may be performed based on a single-SCI scheme or a multi-SCI scheme. When the single-SCI scheme is used, data transmission (e.g., sidelink data transmission, sidelink-shared channel (SL-SCH) transmission) may be performed based on one SCI (e.g., 1st-stage SCI). When the multi-SCI scheme is used, data transmission may be performed using two SCIs (e.g., 1st-stage SCI and 2nd-stage SCI). The SCI(s) may be transmitted on a PSCCH and/or a PSSCH. When the single-SCI scheme is used, the SCI (e.g., 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'. A format of the first-stage SCI may include a SCI format 1-A, and a format of the second-stage SCI may include a SCI format 2-A, a SCI format 2-B, and a SCI format 2-C.

The SCI format 1-A may be used for scheduling a PSSCH and second-stage SCI. The SCI format 1-A may include at least one among priority information, frequency resource assignment information, time resource assignment information, resource reservation period information, demodulation reference signal (DMRS) pattern information, second-stage SCI format information, beta_offset indicator, number of DMRS ports, modulation and coding scheme (MCS) information, additional MCS table indicator, PSFCH overhead indicator, or conflict information receiver flag.

The SCI format 2-A may be used for decoding of a PSSCH. The SCI format 2-A may include at least one among a HARQ processor number, new data indicator (NDI), redundancy version (RV), source ID, destination ID, HARQ feedback enable/disable indicator, cast type indicator, or CSI request.

The SCI format 2-B may be used for decoding of a PSSCH. The SCI format 2-B may include at least one among a HARQ processor number, NDI, RV, source ID, destination ID, HARQ feedback enable/disable indicator, zone ID, or communication range requirement.

The SCI format 2-C may be used for decoding of a PSSCH. In addition, the SCI format 2-C may be used to provide or request inter-UE coordination information. The SCI format 2-C may include at least one among a HARQ processor number, NDI, RV, source ID, destination ID, HARQ feedback enable/disable indicator, CSI request, or providing/requesting indicator.

When a value of the providing/requesting indicator is set to 0, this may indicate that the SCI format 2-C is used to provide inter-UE coordination information. In this case, the SCI format 2-C may include at least one among resource combinations, first resource location, reference slot location, resource set type, or lowest subchannel indexes.

When a value of the providing/requesting indicator is set to 1, this may indicate that the SCI format 2-C is used to request inter-UE coordination information. In this case, the SCI format 2-C may include at least one among a priority, number of subchannels, resource reservation period, resource selection window location, resource set type, or padding bit(s).

In embodiments, according to the agreements reached at the NR standard meetings, the following contents have been agreed upon.

Agreement 1

A sidelink-SSB (S-SSB) structure for a normal CP (NCP) has been determined. An S-SSB structure for an extended CP (ECP) has the same structure, except that the number of PSBCH symbols after S-SSS is 6.

Agreement 2

An S-SSB periodicity of 160 ms is supported for all subcarrier spacings (SCSs).

The number of S-SSB transmissions within one S-SSB period is (pre)configurable.

For FR1:

The number of transmissions may be (pre)configured as {1} for 15 kHz SCS, {1, 2} for 30 kHz SCS, and {1, 2, 4} for 60 kHz SCS.

For FR2:

The number of transmissions may be (pre)configured as {1, 2, 4, 8, 16, 32} for 60 kHz SCS, and {1, 2, 4, 8, 16, 32, 64} for 120 kHz SCS.

Agreement 3

672 SL-SSIDs are divided into two sets to represent different synchronization priorities according to a similar approach as in LTE-V2X.

id_net configuration {0, 1, . . . , 335} id_oon configuration {336, 337, 338, . . . , 671}

The usage of 0 is the same as 0 in LTE.

The usage of 336 is the same as 168 in LTE.

The usage of 337 is the same as 169 in LTE.

Agreement 4

S-SSB transmission triggering in NR V2X reuses the same mechanism as in LTE V2X.

Agreement 5

S-SSBs within a period of 160 ms may be distributed at equal intervals using (pre)configured parameters below.

Offset from a start of the S-SSB period to the first S-SSB

Spacing between adjacent S-SSBs

Embodiments of the present disclosure described below provide methods for initial beam pairing for UEs and a system that attempt efficient transmission and reception of data through beam pairing in SL communication. In SL communication, data transmission and reception through beam pairing may operate in both FR1 or FR2 bands.

Figure 9:
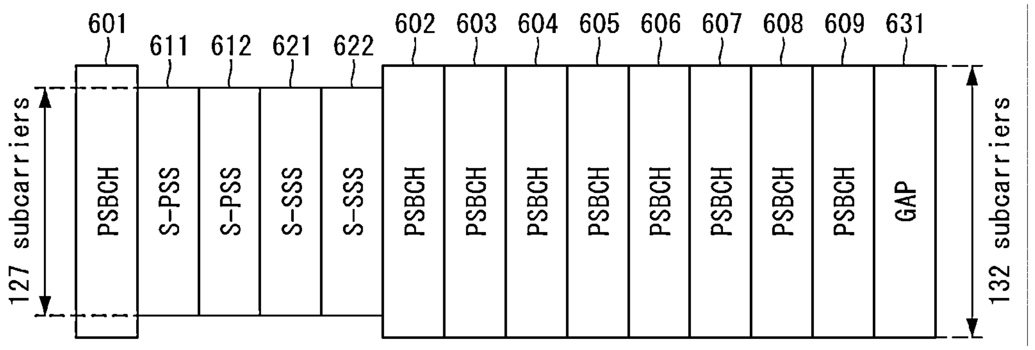
FIG. 9 is a conceptual diagram for describing a structure of a sidelink synchronization signal block in the 5G NR mobile communication system, according to an embodiment of the present disclosure.

FIG. 9 is a conceptual diagram for describing a structure of a sidelink synchronization signal block in the 5G NR mobile communication system, according to an embodiment.

A sidelink synchronization signal block (S-SSB) illustrated in FIG. 9 illustrates a case of normal cyclic prefix (normal CP). In FIG. 9, the horizontal axis may be a time axis, and the vertical axis may be a frequency axis. In the NR system, an SCS varies depending on a numerology and may have a normal CP or extended CP based on a delay spreading. One slot constituting a sidelink synchronization signal block with a normal CP may be composed of 14 OFDM symbols as illustrated in FIG. 9.

As shown in FIG. 9, in the time domain, a physical sidelink broadcast channel (PSBCH) is transmitted in the first symbol 601, a sidelink primary synchronization signal (S-PSS) is transmitted in the second symbol 612 and third symbol 613, and a sidelink secondary synchronization signal (S-SSS) is transmitted in the fourth symbol 621 and fifth symbol 622. Then, the PSBCH is transmitted in 8 symbols 602 to 609. The last symbol 631 is a gap symbol (GAP), and usually referred to as a guard. No data is transmitted in the last symbol 631.

Although not illustrated in FIG. 9, in an extended CP case where one slot is configured with 12 OFDM symbols, an S-SSB may include 2 S-PSS symbols, 2 S-SSS symbols, and 7 PSBCH symbols. Accordingly, in the extended CP case, there are two fewer PSBCH symbols than in the normal CP case. In both cases of the normal CP and the extended CP, no signal is transmitted in the last symbol of the slot.

In addition, as illustrated in FIG. 9, the PSBCH symbols 601 and 602 to 609 may be configured with 132 subcarriers, and the S-PSS symbols 611 and 612 and the S-SSS symbols 621 and 622 may be configured with 127 subcarriers. Therefore, it can be seen that the S-SSB is transmitted through 11 resource blocks (RB) within a sidelink bandwidth part (SL BWP).

A signal having the S-SSB structure described in FIG. 9 may be transmitted by a transmitting entity (e.g., transmitting UE transmitting S-SSB) through one beam. In addition, as described in the above agreements, the periodicity of S-SSB is 160 ms, and a plurality of S-SSBs may be (pre)configured to be transmitted during one S-SSB period. When configured to transmit a plurality of S-SSBs during one S-SSB period, the transmitting UE may transmit the same S-SSB through different beams.

A structure of S-SSBs transmitted in a beam pairing scheme may be designed by modifying or expanding the structure shown in FIG. 9. In this case, a reference signal for beam pairing purposes may be additionally defined, designed, and operated. For example, transmission of a beam reference signal (BRS) multiplexed with S-SSB in the frequency or time resource domain may be possible. The BRS may be transmitted in a beam sweeping manner at a specific periodicity.

In the present disclosure, the receiving UE (RX-UE) may be assumed to obtain information on a transmission beam of a transmitting UE (TX-UE) among beams transmitted by the TX-UE, through which the RX-UE can receive data, based on signals such as S-SSB and BRS transmitted from the TX-UE. In addition, the RX-UE may be assumed to obtain information on a reception beam among beams usable by the RX-UE, through which the RX-UE can receive data, based on reception beam sweeping, when the RX-UE receives signals (e.g., S-SSB, BRS, etc.) transmitted by the TX-UE. In other words, it is assumed that information on a pair of beams between the TX-UE and RX-UE is obtained in transmission and reception procedures of signals such as S-SSB, BRS, etc.

In addition, a reciprocity may be assumed for a beam pair. Accordingly, when the receiving UE transmits data or control information to the transmitting UE, its respective paired beams may be used as they are. In other words, it is assumed that the transmission beam of the receiving UE may be used as a reception beam at the transmitting UE, and the reception beam of the transmitting UE may be used as a transmission beam at the receiving UE.

Figure 10:
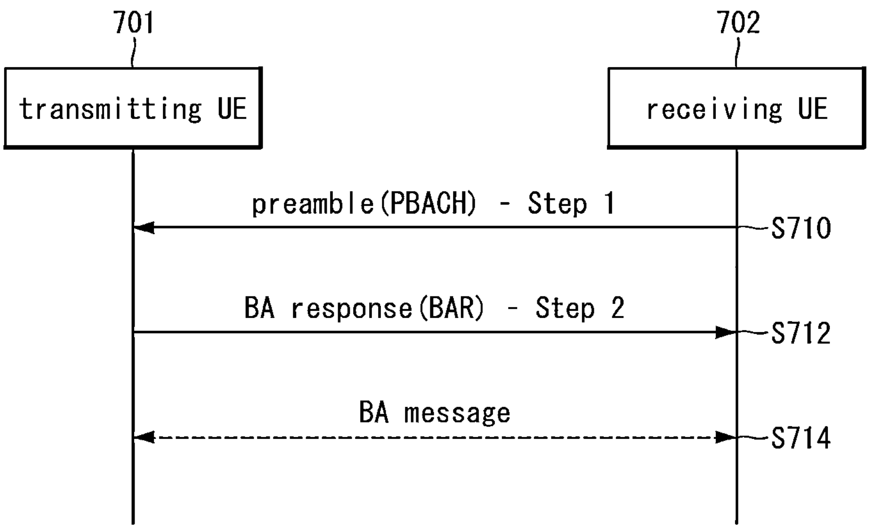
FIG. 10 is a diagram illustrating an initial beam access procedure for initial beam pairing in SL communication, according to an embodiment of the present disclosure.

FIG. 10 is a diagram illustrating an initial beam access procedure for initial beam pairing in SL communication, according to an embodiment.

As shown in FIG. 10, both a transmitting UE (TX-UE) 701 and a receiving UE (RX-UE) 702 may be UEs capable of performing sidelink communication. In addition, both the transmitting UE (TX-UE) 701 and the receiving UE (RX-UE) 702 are capable of performing operations according to the present disclosure described below. The transmitting UE 701 and receiving UE 702 may include at least some of the components previously described in FIG. 3.

As shown in FIG. 10, in a step or operation S710, the receiving UE 702 may transmit a preamble to the transmitting UE 701. In the following description, a channel through which the receiving UE 702 transmits the preamble to the transmitting UE 701 are referred to as a physical beam access channel (PBACH). A PBACH resource may be configured as a time and frequency resource configured to transmit a preamble. In addition, the receiving UE 702 may transmit the preamble in a resource region corresponding to a beam of the transmitting UE 701 within the PBACH resource, based on information on a beam pair obtained before transmitting the preamble through the PBACH. In this case, a beam through which the receiving UE 702 transmits the preamble may be a beam paired with the beam of the transmitting UE 701.

In the step or operation S710, it is assumed that the transmitting UE 701 attempts reception with designated beams. Therefore, in the step or operation S710, the transmitting UE 701 may attempt to receive the preamble using beams that can be received by the transmitting UE 701 within the PBACH resource. If the transmitting UE 701 receives the PBACH resource in the step or operation S710, the transmitting UE 701 may proceed to a step or operation S712.

In the step or operation S712, the transmitting UE 701 may transmit a beam access (BA) response (BAR) to the receiving UE 702. The receiving UE 702 may receive the BAR transmitted by the transmitting UE 702 in the step or operation S712. If the receiving UE 702 receives the BAR in the step or operation S712, the receiving UE 702 may perform a step or operation S714. In addition, in the following description, the step or operation S710, in which the receiving UE 702 transmits the preamble to the transmitting UE 701, may be referred to as '<Step 1>', and the step or operation S712, in which the transmitting UE 701 transmits the BAR to the receiving UE 702, may be referred to as '<Step 2>'.

In a step or operation S714, a BA message may be transmitted/received between the transmitting UE 701 and the receiving UE 702. For example, the transmitting UE 701 and the receiving UE 702 may perform a procedure for exchanging an additional BA message after <Step 2> based on information exchanged between the UEs through signaling in or before <Step 2>. As another example, the procedure for exchanging the additional BA message may not be performed after <Step 2>.

For example, after <Step 2>, it may be confirmed whether the transmitting UE 701 and the receiving UE 702 are UEs to transmit and receive data to or from each other. As another example, if a collision occurs with another UE transmitting a preamble, a signaling procedure for resolving the collision may be required. In other words, the step or operation S714 after <Step 2> may be performed in various forms. In embodiments of the present disclosure, an initial beam access procedure may include operations of the transmitting UE and the receiving UE in <Step 1> and <Step 2> of FIG. 10, as well as each step for signaling after <Step 2>.

[Step 1: Preamble Transmission/PBACH]

The preamble that can be used by the receiving UE 702 in the step or operation S710 may be defined as a portion of PRACH preambles according to the NR specifications. The preambles according to the NR specifications are described briefly below.

Each preamble according to the NR specifications may be divided into a cyclic prefix (CP) part and a preamble sequence part. The preamble sequence part may be used with or without repetition.

In addition, the preambles may be classified into long preambles and short preambles. The long preambles may only be used in an FR1 frequency band below 6 GHz, and an SCS therefor may be 1.25 KHz or 5 KHz. On the other hand, the short preambles may be used in an FR2 frequency band that is a frequency band higher than the FR1 frequency band below 6 GHz. When the short preamble is used in the FR1 band, 30 kHz SCS may be used, and when the short preamble is used in the FR2 band, 60 KHz or 120 KHz SCS may be used.

Four formats may be used for the long preambles, specifically Format 0, Format 1, Format 2, and Format 3. In addition, nine formats may be used for the short preambles, specifically Format A1, Format A2, Format A3, Format B1, Format B2, Format B3, Format B4, Format C0, and Format C1.

The receiving UL 702 according to the present disclosure may use the short preamble as shown in Table 3 below, which is used in a system using a high frequency band or a relatively wide SCS, as the preamble for the initial beam access procedure.

TABLE 3

| Format | Number of Repetitions | CP length (us) | Preamble Length (us) (not including CP) |
|---|---|---|---|
| A1 | 2 | 9.4 | 133 |
| A2 | 4 | 18.7 | 267 |
| A3 | 6 | 28.1 | 400 |
| B1 | 2 | 7.0 | 133 |
| B2 | 4 | 11.7 | 267 |
| B3 | 6 | 16.4 | 400 |
| B4 | 12 | 30.5 | 800 |
| C0 | 1 | 40.4 | 66.7 |
| C2 | 4 | 66.7 | 267 |

Referring to Table 3, it can be seen that Format A1 and Format B1 have the same preamble length, Format A2, Format B2, and Format C2 have the same preamble length, and Format A3 and Format B3 have the same preamble length. Further, it can be seen that Format C0 has the shortest preamble length, and Format B4 has the longest preamble length.

Configuration information or indication for configuring and using one of the short preamble formats as shown in Table 3 may need to be preconfigured between the transmitting UE 701 and the receiving UE 702. The configuration information or indication may be transmitted through higher layer signaling, such as RRC signaling and/or MAC CE signaling. As another example, configuration information for configuring and using one of the short preamble formats as shown in Table 3 or information for indicating one of the configuration information may be transmitted through the S-MIB and/or S-SIB. Such configuration may be made in a cell-specific or resource pool (RP)-specific manner.

In case of preambles used for NR PRACH, the CP length may be configured considering a propagation delay based on a distance between a base station and a UE, and cyclic shifts used to generate multiple Zadoff-Chu sequences each of which is a preamble sequence from the same root sequence may be configured. Then, a plurality of different preamble sequences may be generated based thereon.

In sidelink communication, e.g., in V2X communication systems, the distance between the transmitting UE 701 and the receiving UE 702 may be shorter than a usual distance between a base station and a UE. For example, because a communication range between the transmitting UE 701 and the receiving UE 702 is narrow, only some of the preamble formats shown in Table 3 may be configured and used as the preamble sequence used for beam access in SL communication.

According to an embodiment of the present disclosure, three groups of preambles may be used as shown in Table 4 below.

TABLE 4

| preamble configuration | preamble formats |
|---|---|
| preamble group #1 | A1, B1, A1 + B1 |
| preamble group #2 | A2, B2, B3, A2 + B2 |
| preamble group #3 | A3, B4, C0, C2 |

Referring to Table 4, in terms of CP lengths, the CP lengths corresponding to all preamble formats of the preamble group #2 may be longer than the CP lengths corresponding to all preamble formats of the preamble group #1. In addition, the respective CP lengths corresponding to preamble formats of the preamble group #3 may be generally longer than the respective CP lengths corresponding to preamble formats of the preamble group #2. Therefore, for the preamble groups in Table 4, the CP length generally becomes longer as the group index increases.

Similar interpretation may be applied also in terms of preamble lengths. For example, the preamble lengths of the preamble Format A1 and preamble Format B1 of the preamble group #1 may be shorter than those of the preamble Format A2 and preamble Format B2 of the preamble group #2, and the preamble length of the preamble Format A2 or B2 may be the same as a concatenation (i.e., A1+B1) of the preamble Format A1 and preamble Format B1. In addition, the preamble lengths of the preamble Format A2 and preamble Format B2 of the preamble group #2 may be shorter than those of the preamble Format A3 and preamble Format B3 of the preamble group #3, and a length of a concatenation of Format A2 and Format B2 may be longer than that of Format A3 or Format B3. Therefore, except for the case of comparing a concatenated preamble with a non-concatenated preamble of another group, the preamble lengths of the preamble groups in Table 4 generally become longer as the group index increases.

Hereinafter, methods for operating the preamble configurations for each group shown in Table 4 according to embodiments of the present disclosure are described.

Operation scheme 1: A specific preamble group may be configured in cell-specific or RP-specific manner, so that the transmitting UE and receiving UE can transmit and receive sequences within the corresponding preamble group.

The operation scheme 1 may be determined according to the preamble length or the CP length, as described above. For example, as the distance between the transmitting UE and the receiving UE increases, a higher group index may be used, and as the distance between the transmitting UE and the receiving UE decreases, a lower group index may be used. When using a preamble group preconfigured between the transmitting UE and the receiving UE, the UE that detects a preamble may have an advantage of increased efficiency of preamble detection.

Operation scheme 2: When performing initial beam access, a sequence from the preamble group #1 may be used, and when the beam access fails, retransmission may be attempted using a sequence from the preamble group #2 having longer CP lengths. When the beam access using the sequence of the preamble group #2 also fails, retransmission may be attempted using a sequence from the preamble group #3 having has the longest CP lengths.

The operation scheme 2 may have an advantage that preamble groups can be sequentially changed without pre-configuring which preamble group to use between the transmitting UE and the receiving UE. In addition, it may have an advantage that the preamble group can be adaptively changed and used even when the distance between the transmitting UE and the receiving UE changes as the transmitting UE and the receiving UE move.

Operation scheme 3: Based on a reference signal received power (RSRP) value for an S-SSB, the receiving UE may select a preamble group to be used according to a specific threshold and may select and transmit a sequence within the preamble group. In this case, a PSBCH or a PSBCH DM-RS of the S-SSB may be used for measuring the RSRP value.

The operation scheme 3 may be used when it is difficult to measure the distance between the transmitting UE and the receiving UE. For example, one of the preamble group #1 to preamble group #3 may be selected using a preset threshold. When three preamble groups are configured as shown in Table 4, two thresholds may be required for selecting one preamble group based on the measured RSRP value. For example, if the measured RSRP is equal to or greater than a first threshold, which is the highest threshold, the distance may be the closest, and thus the preamble group #1 may be used. In addition, if the measured RSRP is between the first threshold and a second threshold lower than the first threshold, the preamble group #2 may be used. If the measured RSRP is lower than the second threshold, the preamble group #3 may be used. Since a received power value RSRP is used in the case of operation scheme 3, it is possible to estimate the distance between the transmitting UE and the receiving UE. Accordingly, a preamble group may be selected based on the estimated distance. In general, a power value measured by each of the transmitting UE and receiving UE may appear similar. Therefore, even if a preamble group to be used by the transmitting UE and the receiving UE is not preconfigured, there may be an advantage in that a preamble can be transmitted and received using the same preamble group.

Configuration information of Table 4 for the three operation schemes described above and configuration information for the specific threshold(s) in the operation scheme 3 may be transmitted through higher layer signaling such as RRC signaling and/or MAC-CE signaling. In addition, in the operation scheme 3, configuration information for the specific threshold(s) or an indication for use of the configuration information may be transmitted through S-MIB and/or S-SIB. Such configuration information may be operated in cell-specific or RP-specific manner.

The three operation schemes based on Table 4 classify preamble groups based on CP lengths. However, in addition to CP lengths, the preamble groups may be configured based on a combination of various conditions such as the number of repetitions of the preamble, length of cyclic shifts used for each preamble format, number of different sequences that can be generated, number of different preambles multiplexable in a PBACH resource configured as a time-frequency resource, and/or the like. In addition, each preamble group may be configured with one or more formats.

In addition, the three operation schemes described above may be simply used as is, expanded, modified, or operated in combination with one or more other schemes. For example, when operating the PBACH according to the present disclosure based on Tables 3 and 4, some of the preamble formats and sequences used for 3GPP NR PRACH and new preamble formats and sequences may be used together. Alternatively, the same operations as the above-described examples may be possible by configuring new preamble formats and sequences without reusing the preamble formats and sequences for 3GPP NR PRACH.

Figure 11:
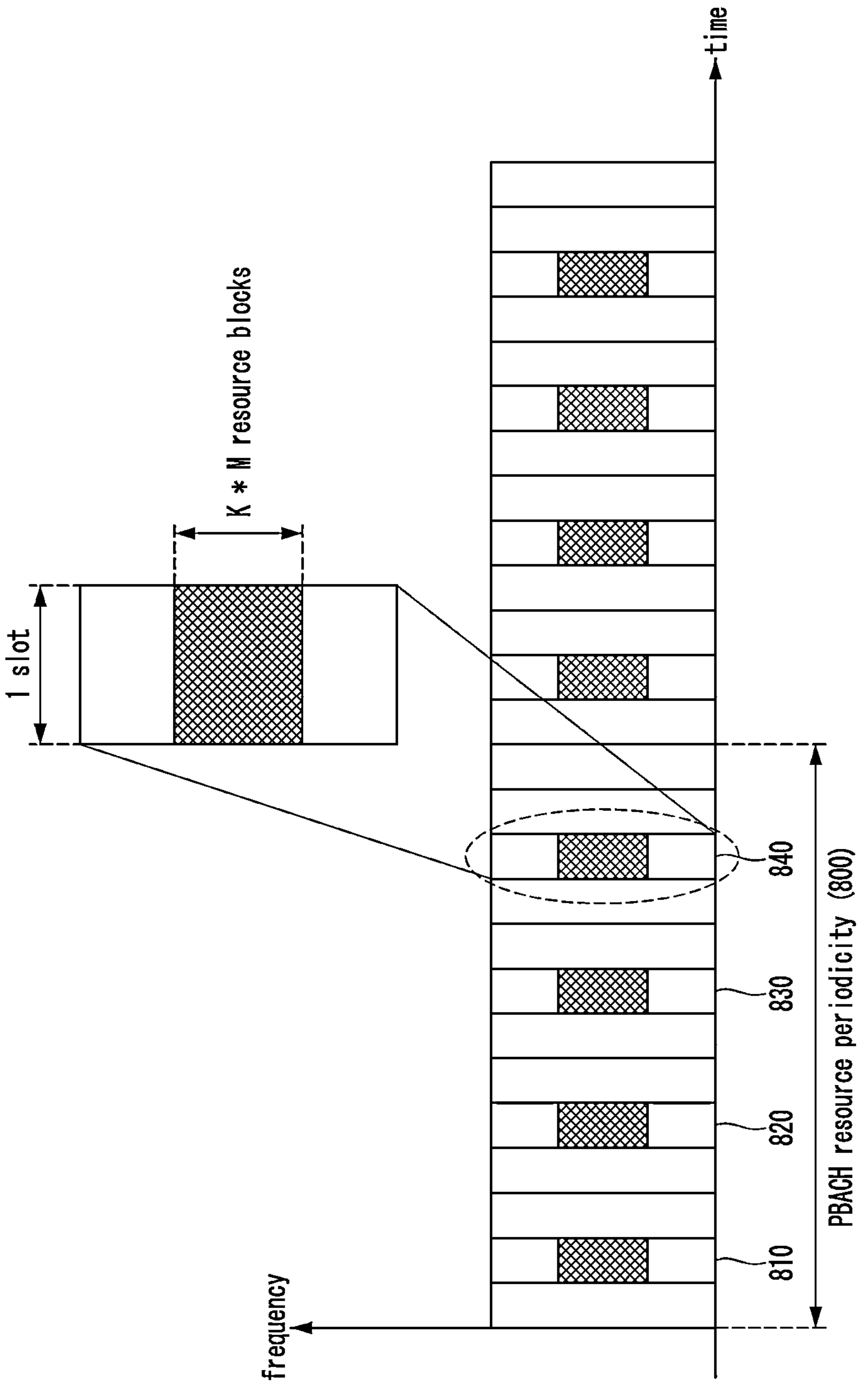
FIG. 11 is a conceptual diagram for describing configuration of a PBACH resource, according to an embodiment of the present disclosure.

FIG. 11 is a conceptual diagram for describing configuration of a PBACH resource, according to an embodiment of the present disclosure.

As shown in FIG. 11, the horizontal axis may be a time axis, and the vertical axis may be a frequency axis. In addition, slots 810, 820, 830, and 840 in which PBACH is transmitted within a PBACH resource period 800 are illustrated. Configuration for PBACH resources may vary depending on an SCS.

As shown in FIG. 11, some slots within the PBACH resource period 800 may be configured as PBACH resources. Taking configuration of one slot (e.g., the fourth slot 840) within the PBACH resource period 800 as an example, K*M resource blocks (RBs) within one slot may be configured as PBACH resources. Multiple RBs may be configured as PBACH resources within one slot. Here, M represents the number of RBs occupied by a preamble bandwidth, and K represents the number of beam access occasions (BAOs) in the frequency domain. Therefore, K may denote the number of cases which indicates how many preambles can be assigned different frequencies in a frequency region allocated to a PBACH resource depending on a bandwidth occupied by the preambles.

When transmitting a PBACH in the manner illustrated in FIG. 11, a periodicity of PBACH resource, configuration of PBACH slots within one period, and configuration of a frequency resource region for PBACH resource in each PBACH slot, and/or the like may be transmitted through higher layer signaling such as RRC signaling and/or MAC-CE signaling. In addition, the periodicity of PBACH resource, configuration of PBACH slots within one period, configuration of a frequency resource region for PBACH resource in each PBACH slot, or indication of the configuration(s) may be transmitted through S-MIB and/or S-SIB. Such configurations may be operated in cell-specific, RP-specific, or UE-specific manner.

In addition, in the example of FIG. 11, a range of the frequency region of PBACH resource may be configured and operated to be the same as a range of a frequency region for S-SSB transmission. Alternatively, a range of the frequency region of PBACH resource may be configured and operated to be smaller than the frequency region for S-SSB transmission.

For example, a position of a slot where a PBACH is first transmitted, i.e., where PBACH transmission begins, may be configured in conjunction with S-SSB. Describing this in more detail, PBACH slots may be operated to start from the N-th slot after an end time of one configured S-SSB period or a slot in which the last S-SSB is transmitted. In addition, the number of slots configured as PBACH resources may be preconfigured. Here, N may be a natural number or an integer greater than 1. Afterwards, the PBACH resources may be operated based on configuration for the periodicity of PBACH resource, PBACH slots, and PBACH frequency resource region within each PBACH slot.

If desiring to configure the PBACH slots to start from the N-th slot after the slot where the last S-SSB is transmitted within one S-SSB period in which PBACH transmission is configured, a time offset value indicating the N-th slot may be transmitted through higher layer signaling such as RRC signaling and/or MAC-CE signaling. In addition, the corresponding configuration information may be transmitted through S-MIB and/or S-SIB, and if various operation schemes are specified through higher layer signaling, one of them may be indicated. Such configuration may be operated in cell-specific, RP-specific, or UE-specific manner.

Figure 12:
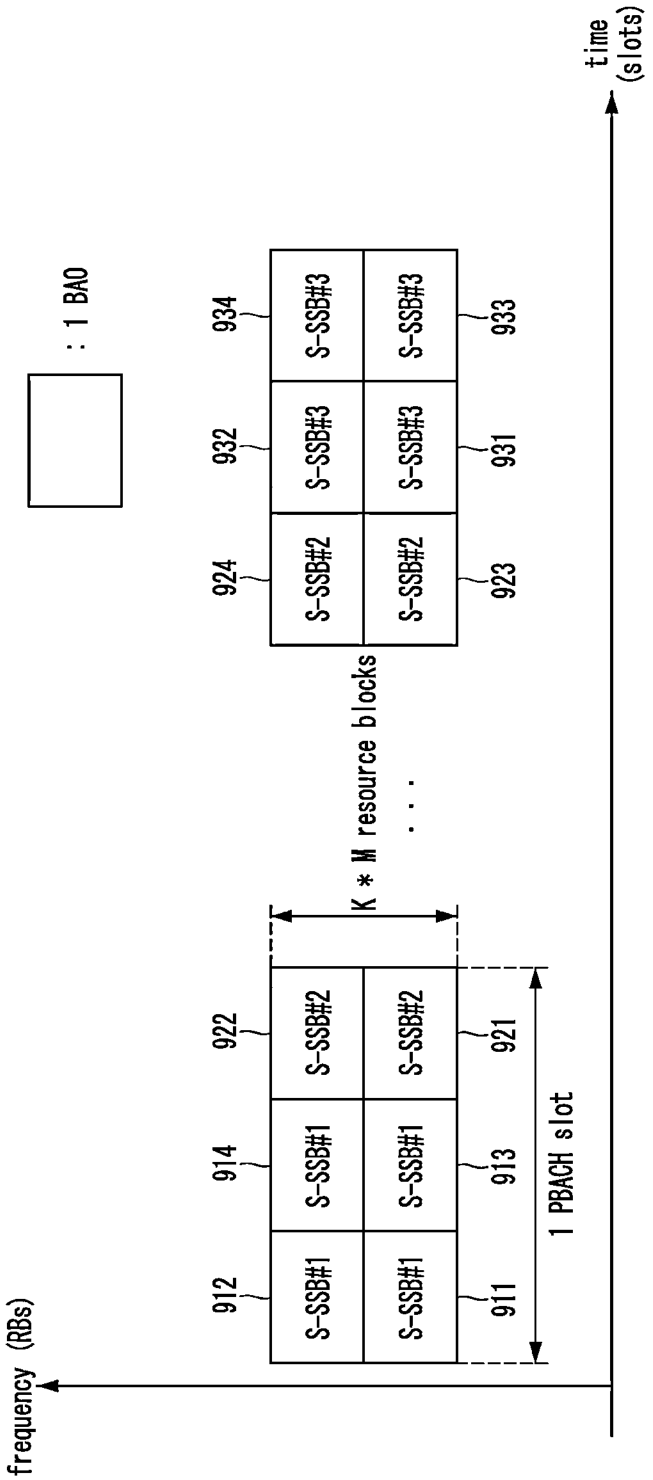
FIG. 12 is a conceptual diagram for describing mapping between S-SSB index and BAO, according to an embodiment of the present disclosure.

FIG. 12 is a conceptual diagram for describing mapping between S-SSB index and BAO, according to an embodiment of the present disclosure.

As shown in FIG. 12, S-SSB #1 911, 912, 913, and 914, S-SSB #2 921, 922, 923, and 924, and S-SSB #3 931, 932, 933 and 934 are illustrated, and each of S-SSB #1, S-SSB #2, and S-SSB #3 may mean a (time) index. In addition, a transmission period of three S-SSBs in the time domain may correspond to one PBACH slot. Two S-SSBs in the frequency domain may correspond to K*M RBs and may correspond to the resource in which PBACH is transmitted within one PBACH slot, which is described in FIG. 11. In FIG. 12, the time-frequency resource through which one S-SSB is transmitted may correspond to one BAO. More specifically, the four S-SSB #1 911, 912, 913, and 914 may respectively correspond to four BAOs, the four S-SSB #2 921, 922, 923, and 924 may respectively correspond to other four BAOs, and finally, the four S-SSB #3 931, 932, 933, and 934 may respectively correspond to other four BAOs. Describing this more comprehensively, the PBACH resource of each PBACH slot illustrated in FIG. 12 may correspond to a case where the PBACH resource has two BAOs in the frequency resource domain and three BAOs in the time resource domain. In addition, FIG. 12 shows an example where four BAOs are configured for one S-SSB index.

The transmitting UE may actually transmit S-SSB(s) using at least some of the S-SSBs illustrated in FIG. 12, i.e., S-SSB resources. Then, the receiving UE may attempt to receive S-SSB(s) according to an S-SSB transmission time. If the receiving UE receives a specific S-SSB without error, the receiving UE may transmit a preamble through a BAO corresponding to the S-SSB received without error. The receiving UE may use at least one of the methods described above to determine the BAO corresponding to the S-SSB received without error.

If the receiving UE receives multiple S-SSBs without error, the receiving UE may transmit a preamble through a BAO corresponding to an S-SSB index having the largest measured value (e.g., RSRP) among values measured based on PSBCHs or PSBCH DM-RSs of the multiple S-SSBs.

According to embodiments of the present disclosure, priorities for mapping S-SSB index to BAO may be as follows.

Frequency resources are mapped with priority over time resources.

If a plurality of preambles can be multiplexed in a time resource region based on preamble formats configured within one slot, they are mapped to time resources after mapping to frequency resources.

S-SSB index(es) may be mapped to BAO(s) in the next PBACH slot.

FIG. 12 illustrates a case where one S-SSB index is mapped to multiple BAOs, but conversely, multiple S-SSB indexes may be operated as being mapped to one BAO. In addition, a specific number of preambles available in each S-SSB index, or preambles available in each S-SSB index may be configured. Such configuration information may be transmitted through higher layer signaling such as RRC signaling and/or MAC-CE signaling.

As another example, such configuration information may be transmitted through S-MIB and/or S-SIB. As another example, when information on a plurality of configurations is transmitted through higher layer signaling, a configuration to be used among the plurality of configurations may be indicated through S-MIB and/or S-SIB.

Such configuration may be operated in cell-specific, RP-specific, or UE-specific manner.

[Step 2: BA Response (BAR)]

When the receiving UE 702 transmits a preamble as in the step or operation S710 of FIG. 10, the transmitting UE 701 may receive the preamble transmitted by the receiving UE 702. The transmitting UE 701 receiving the preamble may transmit a BAR, which is a response to the preamble, to the receiving UE 702. The BAR may be transmitted through a PSCCH and/or PSSCH. In this case, the BAR may include all or part of the following information. Some or all of the information in the BAR described below may be transmitted through higher layer signaling such as MAC-CE signaling and/or RRC signaling.

<Examples of Information Included in BAR>

Information on the preamble received by the transmitting UE 701 in <Step 1>

Timing correction information based on a preamble reception timing

The timing correction information may be applied from a time at which a BA message 3 is transmitted in <Step 3>, which is described in more detail below.

(4) Information on a frequency and time resource to be used to transmit a BA message 3

The information on a frequency and time resource to be used to transmit a BA message 3 may indicate a resource for PSCCH and/or PSSCH transmission. For example, control information for a BA message 3 may be transmitted on a PSCCH, and the BA message 3 may be transmitted on a PSSCH. In addition, if transmission of a PSFCH for hybrid automatic repeat request (HARQ) feedback (FB) for the BAR is required instead of the BA message 3, the information on the frequency and time resource may be replaced with configuration information for a PSFCH resource.

(5) Identifier (ID) information of the transmitting UE (6) Identifier (ID) information of receiving UE(s) to which the transmitting UE wishes to transmit data (7) Data transmit indicator (DTI)

In addition to the information described above, additional information may be transmitted, or only part of the above information may be transmitted. In addition, the DTI among the above-described information may be an indicator for indicating that data which the S-SSB transmitting entity (i.e., transmitting UE) wishes to transmit exists. The DTI may be indicating by using a 1-bit field within SC. Alternatively, the DTI may be indicated by higher layer signaling such as RRC signaling and/or MAC-CE signaling.

Example embodiments are described below based on what has been described above.

Case 1

A case is described in which an ID of the transmitting UE, ID(s) of desired receiving UE(s), and the DTI are all delivered to receiving UEs in the step of transmitting S-SSB before initial beam access, i.e., before transmitting the preamble in <Step 1>. The case is described referring again to FIG. 10. In the description of FIG. 10, the case in which additional BA message exchange procedures may not be performed after <Step 2> has been briefly described. This case is described again from the above premise. This case may correspond to a case where the step or operation S714 in FIG. 10 is not performed.

Before referring to FIG. 10, a step of transmitting S-SSB before <Step 1> (before the step or operation S710), which is not illustrated in FIG. 10, may be performed. In the step of transmitting S-SSB, the transmitting UE 701 may transmit the ID of the transmitting UE ID, ID(s) of desired receiving UE (s), and DTI. The ID of the transmitting UE, ID(s) of desired receiving UE (s), and DTI provided to the receiving UE(s) in the step of transmitting S-SSB may be configured by higher layer signaling such as MAC-CE, RRC, S-SIB, and/or S-MIB signaling. Here, the ID(s) of desired receiving UE(s) may refer to ID(s) of receiving UE(s) to which the transmitting UE wishes to transmit data.

In the step or operation S710 after transmitting S-SSB, the receiving UE 702 may transmit a preamble to the transmitting UE 701 through a PBACH. In this case, the receiving UE 702 may be a UE that wishes to perform SL communication with the transmitting UE 701. Accordingly, only the receiving UE 702 that wishes to perform SL communication with the transmitting UE 701 may transmit a preamble to the transmitting UE 701 in <Step 1> (the step or operation S710). As described above, the receiving UE 702 may perform beam pairing with the transmitting UE 701 in the step of transmitting S-SSB. Accordingly, the receiving UE 702 may transmit the preamble to the transmitting UE 701 using a beam identified through the beam pairing.

In the step or operation S710, the transmitting UE 701 may receive the preamble in a PBACH resource by using a beam identified through the beam pairing with the receiving UE 702. The transmitting UE 701 may transmit a BAR to the receiving UE 702 in the step or operation S712. In other words, the transmitting UE 701 may transmit the BAR to the receiving UE 702 in <Step 2>. In this case, the BAR may include information indicating that the preamble has been received without error using the beam identified through the beam pairing.

Once the transmitting UE 701 transmits the BAR to the receiving UE 702 in <Step 2> (the step or operation S712), the initial beam access procedure may be completed.

Hereinafter, various cases in which the step or operation S714 described in FIG. 10 is performed are described.

Figure 13:
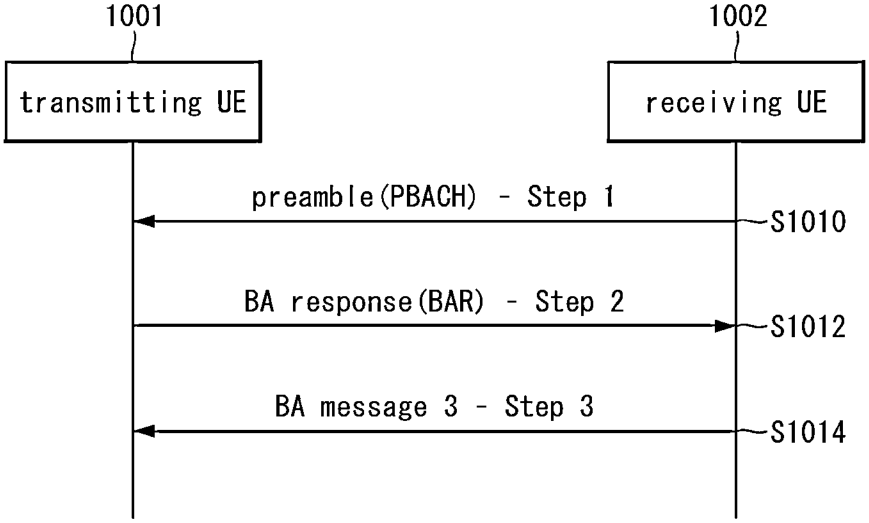
FIG. 13 is a signal flow diagram for a case where a receiving UE performs an initial beam access procedure for a transmitting UE, according to another embodiment of the present disclosure.

FIG. 13 is a signal flow diagram for a case where a receiving UE performs an initial beam access procedure for a transmitting UE, according to another embodiment of the present disclosure.

Before referring to FIG. 13, the S-SSB-based beam pairing operation between the transmitting UE 1001 and the receiving UE 1002 performed before <Step 1>, which was described above with reference to FIG. 10, may also be applied to FIG. 13. FIG. 13 is described below under this assumption.

As shown in FIG. 13, in a step or operation S1010, a receiving UE 1002 may transmit a preamble to a transmitting UE 1001 through a PBACH using a BACH resource. This may be the same operation as <Step 1> previously described in FIG. 10. The receiving UE 1002 may be a UE that wishes to perform SL communication with the transmitting UE 1001, and the receiving UE 1002 may transmit the preamble to the transmitting UE 1001 using a beam identified through beam paring. In the step or operation S1010, the transmitting UE 1001 may receive the preamble in the PBACH resource using a beam identified through the beam paring with the receiving UE 1002 (<Step 1>).

In a step or operation S1012, the transmitting UE 1001 may transmit a BAR to the receiving UE 1002 (<Step 2>). In this case, the BAR may include information indicating that the preamble has been received without error using the beam identified through the beam pairing.

The BAR transmitted by the transmitting UE 1001 in the step or operation S1012 may include information on a frequency and time resource to be used for transmission of a BA message in a step or operation S1014, i.e., a resource for PSCCH and PSSCH transmission or a PSFCH resource for HARQ FB transmission for the BAR.

In the step or operation S1014, the receiving UE 1002 may transmit a BA message to confirm the BAR. In this case, if there are two or more receiving UEs, each receiving UE may transmit the BA message (<Step 3>). Since the BA message transmitted by the receiving UE 1002 in the step or operation S1014 may the third message among the messages illustrated in FIG. 13, it may also be referred to as 'BA message 3'.

The BA message transmitted by the receiving UE 1002 in the step or operation S1014 may be transmitted through a PSCCH and PSSCH. As another example, the BA message transmitted by the receiving UE 1002 in the step or operation S1014 may be transmitted through a PSFCH.

If the BA message transmitted in the step or operation S1014 is transmitted through a PSCCH and PSSCH, the BA message may include information on the ID of the receiving UE. In addition, in the step or operation S1014, the receiving UE 1002 may transmit beam configuration information, such as a beam index used for SL communication with the transmitting UE 1001, by including it in the BA message 3. In addition, in the step or operation S1014, the receiving UE 1002 may include, in the BA message 3, indication information indicating that the BAR has been received without error and the transmitting UE 1001 is a UE with which the receiving UE 1002 wishes to perform SL communication.

In addition, the case where the BA message 3 transmitted in the step or operation S1014 is transmitted through a PSFCH in form of a HARQ FB may correspond to a case where the transmitting UE 1001 includes the ID of the transmitting UE and the ID of the receiving UE in the BAR transmitted to the receiving UE 1002 for PSFCH resource configuration. When configuration of a PSFCH resource is made as described above, the receiving UE 1002 may transmit ACK or NACK in the step or operation S1014. For example, in the step or operation S1014, the receiving UE 1002 may configure ACK as the BA message 3 to indicate that the receiving UE 1002 has received the BAR without error and the transmitting UE 1001 is a UE with which the receiving UE 1002 wishes to perform SL communication, and transmit the BA message 3 to the transmitting UE 1001 through the PSFCH. On the other hand, if there is an error in the received BAR or if the UE to perform SL communication does not match, or both, the receiving UE 1002 may configure NACK as the BA message 3 and transmit the BA message 3 to the transmitting UE 1001 through the PSFCH.

Figure 14:
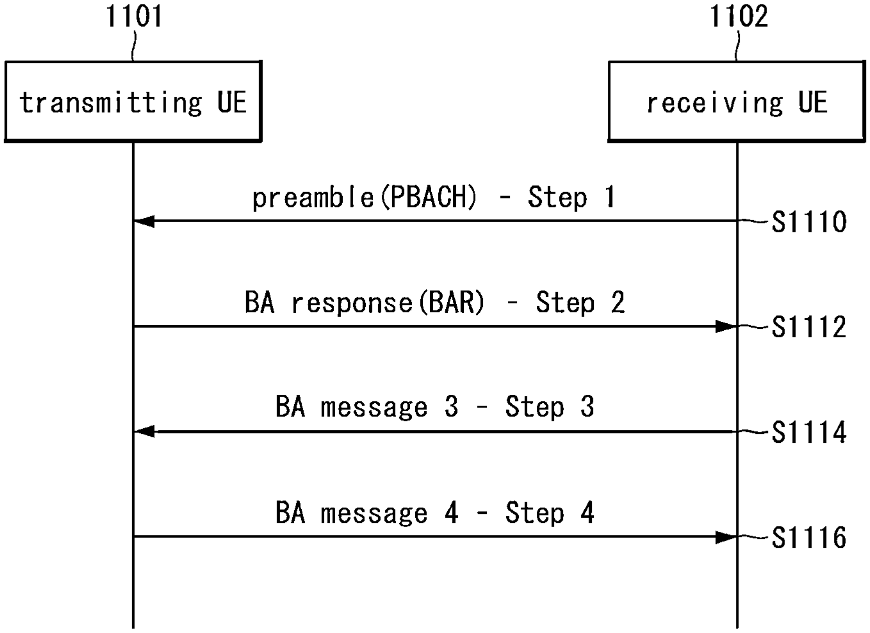
FIG. 14 is a signal flow diagram for a case where a receiving UE performs an initial beam access procedure for a transmitting UE, according to another embodiment of the present disclosure.

FIG. 14 is a signal flow diagram for a case where a receiving UE performs an initial beam access procedure for a transmitting UE, according to another embodiment of the present disclosure.

Before referring to FIG. 14, the S-SSB-based beam pairing operation between the transmitting UE 1001 and the receiving UE 1002 performed before <Step 1>, which has been described using FIGS. 10 and 13, may also be applied to FIG. 14. FIG. 14 is described below under this assumption.

As shown in FIG. 14, in a step or operation S1110, a receiving UE 1102 may transmit a preamble to a transmitting UE 1101 through a PBACH using a BACH resource. In this case, the receiving UE 1102 may transmit the preamble to the transmitting UE 1101 using a beam identified through beam paring in a step of transmitting S-SSB. Accordingly, the transmitting UE 1101 may receive the preamble in the PBACH resource using a beam identified through the beam paring with the receiving UE 1102 (<Step 1>).

In a step or operation S1112, the transmitting UE 1101 may transmit, to the receiving UE 1102, a BAR including information indicating that the preamble has been received without error using the beam identified through the beam pairing (<Step 2>). In this case, the BAR may include information on a frequency and time resource to be used for transmission of a BA message in a step or operation S1114, i.e., a resource for PSCCH and PSSCH transmission, or a PSFCH resource for HARQ FB transmission for the BAR.

In the step or operation S1114, the receiving UE 1102 may transmit a BA message 3 to confirm the BAR. If there are two or more receiving UEs, each receiving UE may transmit the BA message 3 (<Step 3>). Since the BA message 3 transmitted by the receiving UE 1102 in the step or operation S1114 is the third message among the messages illustrated in FIG. 14, it may be referred to as 'BA message 3'. In the step or operation S1114, unlike in FIG. 13 described above, the BA message 3 may be transmitted only through a PSCCH and/or PSSCH. In other words, a case where the PSFCH is used as in FIG. 13 may be excluded.

The BA message 3 transmitted through a PSCCH and PSSCH in the step or operation S1114 may include information on the ID of the receiving UE. In addition, the BA message 3 may further include beam configuration information such as a beam index used for SL communication with the transmitting UE 1001. In addition, the BA message 3 may further include indication information indicating that the receiving UE has received the BAR without error and the transmitting UE 1101 is a UE with which the receiving UE wishes to perform SL communication. The BA message 3 transmitted from the receiving UE 1102 to the transmitting UE 1101 in the step or operation S1114 may include information on a frequency and time resource to be used by the transmitting UE 1101 in the step or operation S1116. For example, the BA message 3 may include information on a resource for PSCCH and PSSCH transmission or a PSFCH resource for HARQ FB transmission for the BA message 3. Accordingly, the transmitting UE 1101 may receive the BA message 3 including at least one of the above-described information in the step or operation S1114.

In a step or operation S1116, the transmitting UE 1101 may transmit a BA message to the receiving UE 1102. In the signal flow shown in FIG. 14, since the BA message that the transmitting UE 1101 transmits to the receiving UE 1102 in the step or operation S1116 is the fourth message among the example messages, the BA message transmitted from the transmitting UE 1101 to the receiving UE 1102 in the step or operation S1116 may be referred to as 'BA Message 4'.

The BA message 4 transmitted in the step or operation S1116 may be transmitted through a PSCCH and PSSCH. As another example, the BA message 4 may be transmitted through a PSFCH.

If the BA message 4 transmitted by the transmitting UE 1101 in the step or operation S1116 is transmitted through a PSCCH and/or PSSCH, the BA message 4 may include information on an ID of a receiving UE. The ID of the receiving UE, which is included in the BA message 4, may be equal to the ID of the receiving UE 1102 that is to communicate with the transmitting UE 1101. If beam access requests have been made from a plurality of UEs, a UE corresponding to one of cases below may become a receiving UE, and the corresponding receiving UE ID may be included in the BA message 4.

A case where data transmission and reception with a specific UE need to be prioritized.

A case where beam pairing with a specific UE needs to be prioritized.

A case where a UE attempting wrong beam access exists and a specific UE for SL data transmission and reception needs to be specified to resolve ambiguity.

A case including at least one of d1 to d3 below.

d1: A situation where a PBACH resource is operated in cell-specific or RP-specific manner.

d2: A situation where beam pairs between UEs performing different SL communications in the same resource region collide while attempting initial beam access.

d3: A situation where an initial beam access proceeds through reception of a preamble from an unintended UE under the situation d2.

A situation where one or more UEs attempt initial beam access to an unintended transmitting UE.

In order to solve the problems of a) to e) described above, beam pairing or beam access between UEs that are actually to perform SL communication may be performed through the processing of exchanging the transmitting UE ID and the receiving UE ID by using the BA message 3 and BA message 4.

The BA message 4 transmitted in the step or operation S1116 may include beam configuration information such as a beam index used by the transmitting UE 1101 for SL communication with the receiving UE 1102. In addition, the BA message 4 may include information indicating that the BA message 3 has been received without error. In addition, the BA message 4 may include information indicating that the receiving UE is a UE with which the transmitting UE wishes to perform SL communication. The BA message 4 may include the ID of the transmitting UE.

A case where the BA message 4 transmitted in the step or operation S1116 is transmitted through a PSFCH in form of a HARQ FB may correspond to a case where the transmitting UE 1101 includes the ID of the transmitting UE ID and the ID of the receiving UE in the BA message 3 transmitted to the receiving UE 1102 for PSFCH resource configuration. When configuration of a PSFCH resource is made as described above, the transmitting UE 1101 may configure ACK as the BA message 4 to indicate that the transmitting UE 1101 has received the BA message 3 without error in the step or operation S1114 and the receiving UE 1102 is a UE with which the transmitting UE 1101 wishes to perform SL communication, and transmit the BA message 4 to the transmitting UE 1001 through the PSFCH. On the other hand, if there is an error in the received BA message 3 or if the UE to perform SL communication does not match, or both, the transmitting UE 1101 may configure NACK as the BA message 4 and transmit the BA message 4 to the receiving UE 1102 through the PSFCH.

Case 2

A case where ID(s) of desired receiving UE(s) and DTI are not delivered to all receiving UEs in the step of transmitting S-SSB before initial beam access (i.e., before preamble transmission in <Step 1>) is described.

When both the DTI and the ID(s) of desired RX-UE(s) are transmitted in the step or operation S712, which is <Step 2> in FIG. 10 described above, UEs whose IDs match the ID(s) of desired receiving UE(s) among receiving UEs that received the BAR may perform initial beam access through the procedure shown in FIG. 13 or FIG. 14. On the other hand, UEs whose IDs do not match the ID(s) of desired receiving UE(s) may complete the initial beam access procedure by using the two-step procedure previously described in FIG. 10.

In the two-step procedure described in FIG. 10, the transmitting UE 701 may include the ID(s) of desired receiving UE(s) in the BAR in the step or operation S712. The case of transmitting the BAR including the ID(s) of desired receiving UE(s) may indicate that there is data to be transmitted to at least one corresponding UE among the desired receiving UE(s). On the other hand, the case of transmitting the BAR not including the ID(s) of desired receiving UE(s) may indicate that there is no data to be transmitted. Accordingly, the two-step procedure described in FIG. 10 may be operated without DTI.

Describing a specific example, if the BAR includes the ID(s) of desired receiving UE(s), UEs whose IDs match the ID(s) of desired receiving UE(s) among receiving UEs receiving the BAR may perform initial beam access through the procedure shown in FIG. 13 or 14. On the other hand, UEs whose IDs do not match the ID(s) of desired receiving UE(s) may complete the initial beam access procedure as in the two-step procedure described using FIG. 10. For example, if there is no desired receiving UE ID(s) in the BAR, the initial beam access procedure may be completed as in the two-step procedure described in FIG. 10.

The operations of the methods according to embodiments of the present disclosure can be implemented as a computer readable program or code in a computer readable recording medium. The computer readable recording medium may include various kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of an apparatus, the aspects may indicate the corresponding descriptions according to a method, and the blocks or apparatus may correspond to the steps of the method or the features of the steps. Similarly, the aspects described in the context of a method may be expressed as the features of the corresponding blocks or items or the corresponding apparatus. Some or all of the steps or operations of the method may be executed by (or using) a hardware apparatus such as a microprocessor, a programmable computer or an electronic circuit. In some embodiments, one or more of the most important steps of the method may be executed by such an apparatus.

In some embodiments, a programmable logic device such as a field-programmable gate array may be used to perform some or all of functions of the methods described herein. In some embodiments, the field-programmable gate array may be operated with a microprocessor to perform one of the methods described herein. In general, the methods are preferably performed by a certain hardware device.

The description of the disclosure is merely illustrative in nature and, thus, variations that do not depart from the substance of the disclosure are intended to be within the scope of the disclosure. Such variations are not to be regarded as a departure from the spirit and scope of the disclosure. Thus, it should be understood by those of ordinary skill in the art that various changes in form and details may be made without departing from the spirit and scope as defined by the following claims.

What is claimed is:

1. A method of a first user equipment (UE), the method comprising:

pairing a second reception beam of a second UE and a first transmission beam of the first UE based on transmission of a sidelink synchronization signal block (S-SSB);

receiving a preamble among preambles included in a preamble group of two or more preamble groups through a first channel, by using a first reception beam of the first UE corresponding to the first transmission beam paired with the second reception beam; and transmitting a beam access response (BAR) based on the received preamble to the second UE using the first transmission beam, wherein the two or more preamble groups are determined based on lengths of cyclic prefixes (CPs) added to preambles.

2. The method according to claim 1, wherein a resource of the first channel is associated with a transmission slot of the S-SSB and is configured within a range of a frequency region for transmitting the S-SSB based on a subcarrier spacing (SCS).

3. The method according to claim 2, wherein the resource of the first channel is configured as a predetermined number of slots starting from a slot after an N-th slot from a transmission slot of a last S-SSB within a transmission period of the S-SSB, through at least one of higher layer signaling, radio resource control (RRC) signaling, medium access control (MAC) control element (CE), or system information (SI), wherein N is a natural number.

4. The method according to claim 1, wherein each of the two or more preamble groups is configured with at least one preamble format used in a physical random access channel (PRACH) based on CP length(s) or preamble length(s), and wherein information of the two or more preamble groups is preconfigured using at least one of RRC signaling, MAC CE, or SI.

5. The method according to claim 1, wherein the BAR includes at least one of information on the received preamble, timing correction information based on a reception timing of the received preamble, information on a frequency and time resource to be used for message transmission of the second UE, information on an identifier (ID) of the first UE, information on an ID of a UE to which the first UE wishes to transmit data, or a data transmit indicator (DTI).

6. The method according to claim 1, further comprising:

in response to transmission of the BAR, receiving, from the second UE, control information for reception of a beam access (BA) message through a physical sidelink control channel (PSCCH); and receiving the BA message through a physical sidelink shared channel (PSSCH) based on the received PSCCH.

7. The method according to claim 6, wherein the BA message includes at least one of information on an identifier (ID) of the second UE, configuration information of a beam of the second UE used for sidelink communication between the second UE and the first UE, information indicating whether an error occurs in the BAR, or information indicating that the second UE is a sidelink communication UE.

8. The method according to claim 6, further comprising, in response to the BA message including data transmitted from the second UE to the first UE, transmitting a response message corresponding to the BA message.

9. A first user equipment (UE), comprising:

a processor configured to cause the first UE to pair a second reception beam of a second UE and a first transmission beam of the first UE based on transmission of a sidelink synchronization signal block (S-SSB), receive a preamble among preambles included in a preamble group of two or more preamble groups through a first channel, by using a first reception beam of the first UE corresponding to the first transmission beam paired with the second reception beam, and transmit a beam access response (BAR) based on the received preamble to the second UE using the first transmission beam, wherein the two or more preamble groups are determined based on lengths of cyclic prefixes (CPs) added to preambles.

10. The first UE according to claim 9, wherein a resource of the first channel is associated with a transmission slot of the S-SSB and is configured within a range of a frequency region for transmitting the S-SSB based on a subcarrier spacing (SCS).

11. The first UE according to claim 10, wherein the resource of the first channel is configured as a predetermined number of slots starting from a slot after an N-th slot from a transmission slot of a last S-SSB within a transmission period of the S-SSB, through at least one of higher layer signaling, radio resource control (RRC) signaling, medium access control (MAC) control element (CE), or system information (SI), wherein N is a natural number.

12. The first UE according to claim 9, wherein information of the two or more preamble groups is preconfigured using at least one of RRC signaling, MAC CE, or SI.

13. The first UE according to claim 9, wherein the BAR includes at least one of information on the received preamble, timing correction information based on a reception timing of the received preamble, information on a frequency and time resource to be used for message transmission of the second UE, information on an identifier (ID) of the first UE, information on an ID of a UE to which the first UE wishes to transmit data, or a data transmit indicator (DTI).

14. The first UE according to claim 9, wherein the processor is further configured to cause the first UE to:

in response to transmission of the BAR, receive, from the second UE, control information for reception of a beam access (BA) message through a physical sidelink control channel (PSCCH); and receive the BA message through a physical sidelink shared channel (PSSCH) based on the received PSCCH.

15. The first UE according to claim 14, wherein the BA message includes at least one of information on an identifier (ID) of the second UE, configuration information of a beam of the second UE used for sidelink communication between the second UE and the first UE, information indicating whether an error occurs in the BAR, or information indicating that the second UE is a sidelink communication UE.

16. The first UE according to claim 14, wherein the processor is further configured to cause the first UE to, in response to the BA message including data transmitted from the second UE to the first UE, transmit a response message corresponding to the BA message.

17. A method of a second user equipment (UE), the method comprising:

pairing a first transmission beam of a first UE and a second reception beam of the second UE based on transmission of a sidelink synchronization signal block (S-SSB);

transmitting, to the first UE, a preamble among preambles included in a preamble group of two or more preamble groups through a first channel, by using a first transmission beam of the second UE corresponding to the second reception beam paired with the first transmission beam of the first UE; and receiving, from the first UE, a beam access response (BAR) for the transmitted preamble using the second reception beam, wherein the two or more preamble groups are determined based on lengths of cyclic prefixes (CPs) added to preambles.

18. The method according to claim 17, wherein a resource of the first channel is associated with a transmission slot of the S-SSB and is configured within a range of a frequency region for transmitting the S-SSB based on a subcarrier spacing (SCS).

19. The method according to claim 18, wherein the resource of the first channel is configured as a predetermined number of slots starting from a slot after an N-th slot from a transmission slot of a last S-SSB within a transmission period of the S-SSB, through at least one of higher layer signaling, radio resource control (RRC) signaling, medium access control (MAC) control element (CE), or system information (SI), wherein N is a natural number.

20. The method according to claim 17, wherein information of the two or more preamble groups is preconfigured using at least one of RRC signaling, MAC CE, or SI.

* * * * *